US007447397B1

(12) United States Patent
Maki et al.

(10) Patent No.: US 7,447,397 B1
(45) Date of Patent: Nov. 4, 2008

(54) OPTICAL SWITCH MATRIX

(75) Inventors: Jeffery J. Maki, Fremont, CA (US);
Christopher M. Look, Pleasanton, CA (US)

(73) Assignee: Dynamic Method Enterprises Limited, Hong Kong (HK)

( * ) Notice: Subject to any disclaimer, the term of this patent is extended or adjusted under 35 U.S.C. 154(b) by 377 days.

(21) Appl. No.: 10/867,948

(22) Filed: Jun. 14, 2004

(51) Int. Cl.
 *G02B 6/26* (2006.01)
(52) U.S. Cl. ........................... 385/17; 385/18
(58) Field of Classification Search ............. 385/16–18
 See application file for complete search history.

(56) References Cited

U.S. PATENT DOCUMENTS

| | | | |
|---|---|---|---|
| 3,871,743 A | 3/1975 | Fulenwider | |
| 4,172,630 A | 10/1979 | Burns et al. | |
| 4,630,883 A | 12/1986 | Taylor et al. | |
| 4,648,687 A | 3/1987 | Yoshida et al. | |
| 4,730,884 A | 3/1988 | Seino et al. | |
| 4,737,003 A | 4/1988 | Matsumura et al. | |
| 4,784,451 A | 11/1988 | Nakamura et al. | |
| 4,805,975 A | 2/1989 | Utaka et al. | |
| 4,813,757 A | 3/1989 | Sakano et al. | |
| 4,852,958 A | 8/1989 | Okuyama et al. | |
| 4,961,619 A | 10/1990 | Hernandez-Gil et al. | |
| 5,148,505 A | 9/1992 | Yanagawa et al. | |
| 5,157,756 A | 10/1992 | Nishimoto | |
| 5,173,956 A | 12/1992 | Hayes | |
| 5,204,921 A | 4/1993 | Kanai et al. | |
| 5,255,332 A | 10/1993 | Welch et al. | |
| 5,329,137 A | 7/1994 | Taylor et al. | |
| 5,369,718 A | 11/1994 | Kamata et al. | |
| 5,452,383 A | 9/1995 | Takiguchi | |
| 5,491,762 A | 2/1996 | Deacon et al. | |
| 5,581,643 A | 12/1996 | Wu | |

(Continued)

FOREIGN PATENT DOCUMENTS

EP 0 137 851 A1 4/1985

(Continued)

OTHER PUBLICATIONS

T. Goh et al., Large-Scale Integrated Silica-Based Thermo-Optic Switches, NTT Review, vol. 13, No. 5, 2001, pp. 18-25.*

(Continued)

*Primary Examiner*—Frank G Font
*Assistant Examiner*—Michael P Mooney
(74) *Attorney, Agent, or Firm*—Blakely, Sokoloff, Taylor & Zafman, LLP

(57) ABSTRACT

An optical switch matrix is described herein. In one embodiment, an exemplary optical switch matrix includes, but is not limited to, multiple input waveguides, multiple output waveguides, for each of the input waveguides and each of the output waveguides, a switching node coupling the respective input waveguide and the respective output waveguide. The switching node includes a first switch coupling the respective input waveguide to an intermediate waveguide and a second switch coupling the intermediate waveguide to the respective output waveguide. The second switch is an X switch having first and second input ports and first and second output ports, the first input port receiving the intermediate waveguide and the first output port coupling to the respective output waveguide. Other methods and apparatuses are also described.

45 Claims, 25 Drawing Sheets

U.S. PATENT DOCUMENTS

| | | | |
|---|---|---|---|
| 5,652,817 | A | 7/1997 | Brinkman et al. |
| 5,757,986 | A | 5/1998 | Crampton et al. |
| 5,887,089 | A | 3/1999 | Deacon et al. |
| 5,908,305 | A | 6/1999 | Crampton et al. |
| 5,911,018 | A | 6/1999 | Bischel et al. |
| 6,061,487 | A | 5/2000 | Toyama et al. |
| 6,259,834 | B1 | 7/2001 | Shani |
| 6,263,125 | B1 | 7/2001 | Nir |
| 6,285,809 | B1 | 9/2001 | Nir et al. |
| 6,335,994 | B1 | 1/2002 | Kato |
| 6,356,679 | B1 | 3/2002 | Kapany |
| 6,449,404 | B1 | 9/2002 | Paiam |
| 6,510,260 | B2 | 1/2003 | Chen et al. |
| 6,614,574 | B2 | 9/2003 | Romanovsky |
| 6,647,165 | B2 | 11/2003 | Hu et al. |
| 6,701,033 | B2 | 3/2004 | Okayama |
| 6,778,736 | B2 | 8/2004 | Markwardt et al. |
| 2001/0010739 | A1* | 8/2001 | Takiguchi et al. ............. 385/15 |
| 2002/0034352 | A1 | 3/2002 | Williams et al. |
| 2002/0085794 | A1 | 7/2002 | Chen et al. |
| 2002/0154853 | A1* | 10/2002 | Duer ........................... 385/17 |
| 2003/0041457 | A1 | 3/2003 | Takeuchi et al. |
| 2003/0190114 | A1 | 10/2003 | Takeuchi et al. |
| 2004/0066999 | A1 | 4/2004 | Sakamoto et al. |

FOREIGN PATENT DOCUMENTS

| | | | |
|---|---|---|---|
| EP | 0 137 851 | B1 | 5/1990 |
| EP | 0 233 011 | B1 | 9/1992 |
| EP | 0 537 703 | A1 | 4/1993 |
| EP | 0 720 754 | B1 | 11/1997 |
| WO | WO 01/40849 | A2 | 6/2001 |
| WO | WO 01/40849 | A3 | 6/2001 |
| WO | WO 01/73490 | A1 | 10/2001 |
| WO | WO 2004/015470 | A1 | 2/2004 |

OTHER PUBLICATIONS

Gregory A. Fish, et al., "Compact, 4×4 InGaAsP-InP Optical Crossconnect with a Scaleable Architecture," pp. 1256-1258, 1998.

Richard A. Soref, et al., "Proposed N-Wavelength M-Fiber WDM Crossconnect Switch Using Active Microring Resonators," pp. 1121-1123, 1998.

Takashi Goh, et al., High-Extinction Ratio and Low-Loss Silica-Based 8×8 Strictly Nonblocking Thermooptic Matrix Switch, pp. 1192-1199, 1999.

Takeshi Saito, et al., "Mechanical Optical Switch Using Flexible Polymeric Waveguide," pp. 14-15, 2002.

G.A. Fish, et al., Compact InGaAsP/InP 1×2 Optical Switch Based on Carrier Induced Supression of Modal Interference, Electronics Letters, vol. 33, No. 22, 2 pages, Oct. 23, 1997.

S. Yu, et al., "Demonstration of High-Speed Optical Packet Routing Using Vertical Coupler Crosspoint Space Switch Array," Electronic Letters, vol. 36, No. 6, 2 pages, Mar. 16, 2000.

* cited by examiner

OPTICAL SWITCH MATRIX

FIELD OF THE INVENTION

The present invention relates generally to fiber optics. More particularly, this invention relates to an optical switch matrix.

BACKGROUND OF THE INVENTION

Integrated optical switches have been widely used recently. To divert light from one waveguide to another, the waveguides are coupled by specific geometric arrangements of the two waveguides in relation to each other, where the coupling is modified by local electro-optical manipulation of their indices of refraction. Typical examples of electro-optical switches include the Mach-Zehnder interferometer 2×2 switch, the directional coupler 2×2 switch, the modal-interference 2×2 switch (e.g., two-mode interference switch, bifurcation optical active switch), the mode-evolution 2×2 switch, the imbalanced y-branch 1×2 switch, the digital-optical switch, and the total internal reflection (TIR) X-switch. Depending on the voltage applied to such switches or in some cases the electrical current actually, light is thus partly or completely diverted from an input waveguide to an output waveguide.

By appropriately combining waveguides and switches, a switch array (also referred to as switch matrix) is formed to switch light from multiple input waveguides among multiple output waveguides. A variety of switch array geometries have been used. Switch arrays based on geometries such as crossbar geometry can be used to divert input signals to output channels arbitrarily. Signals from any input channels can be directed to any output channel, and even to multiple output channels, in broadcast and multicast transmission modes.

FIG. 1A is a layout illustrating a typical switch array having crossbar geometry. A set of input waveguides 101 crosses a set of output waveguides 102 via multiple switching nodes, such as switching node 103, disposed at the crossing points to divert an incoming optical signal from any one of the input waveguides 101 to any one of the output waveguides 102. FIG. 1B is an enlarged portion of switching node 103 shown in FIG. 1A. Referring to FIG. 1B, an incoming optical signal traveling along waveguide 104 is routed or diverted to one of waveguides 105 and 106 via the switching element 110. The switching element 110 may be referred to herein as an X switch having two input ports and two output ports.

Single crossbar switching elements are used in the structures shown in FIGS. 1A and 1B. Alternatively, a double crossbar switching node may also be used in place of switching node 103. FIG. 2A is a layout illustrating a typical double crossbar switching node. The double crossbar switching node 200 includes switches 203 and 204, which are Y switches. In order to reach from waveguide 201 to waveguide 202, the incoming optical signal is routed by switch 204 onto an intermediate waveguide 205 and routed again by switch 203 onto waveguide 202. In addition, an optical mirror may be used to direct an optical signal from one direction into another direction. FIG. 2B is a layout illustrating a typical optical mirror. The optical mirror 253 is used to direct an incoming optical signal traveling waveguide 251 from one direction to waveguide 252 of different direction.

A typical switch employs the thermo-optic effect in a localized manner to control the refractive index within polymer waveguide structures to switch and attenuate the optical signals, which may limit the switching speed of the switch. Further, there has been a lack of commercially available switches possessing microsecond operation that have integrated variable optical attenuators and integrated optical power monitoring. The lack of integrated power monitoring means external components are required, which makes the overall approach more cumbersome and bulky.

SUMMARY OF THE INVENTION

An optical switch matrix is described herein. In one embodiment, an exemplary optical switch matrix includes, but is not limited to, multiple input waveguides, multiple output waveguides, for each of the input waveguides and each of the output waveguides, a switching node coupling the respective input waveguide and the respective output waveguide. The switching node includes a first switch coupling the respective input waveguide to an intermediate waveguide and a second switch coupling the intermediate waveguide to the respective output waveguide. The second switch is an X switch having a first and second input ports and a first and second output ports, the first input port receiving the intermediate waveguide and the first output port coupling to the respective output waveguide.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

An optical switch matrix is described herein. In the following description, numerous specific details are set forth (e.g., such as logic resource partitioning/sharing/duplication implementations, types and interrelationships of system components, and logic partitioning/integration choices). However, it is understood that embodiments of the invention may be practiced without these specific details. In other instances, well-known circuits, software instruction sequences, structures and techniques have not been shown in detail in order not to obscure the understanding of this description.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct contact with each other (e.g., physically, electrically, optically, etc.). "Coupled" may similarly mean that two or more elements are in direct contact (physically, electrically, optically, etc.). However, "coupled" may alternatively mean that two or more elements are not in direct contact with each other, but yet still co-operate or interact with each other.

Figure 3:
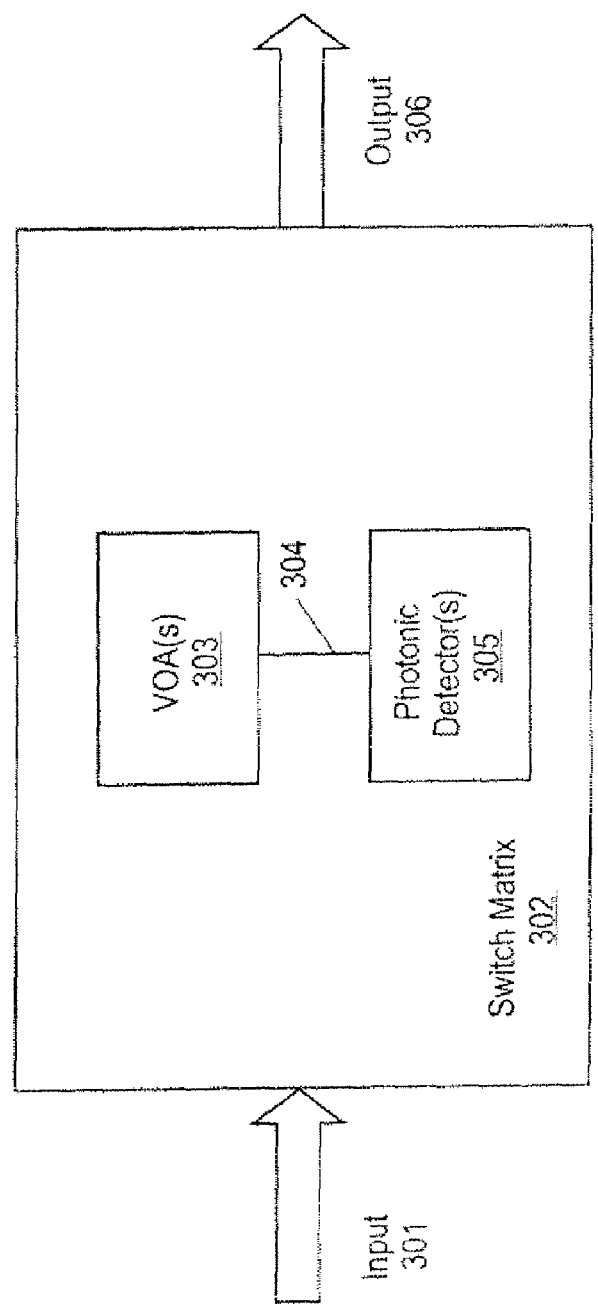
FIG. 3 is a block diagram illustrating an exemplary optical switch fabric according to one embodiment of the invention.

FIG. 3 is a block diagram illustrating an exemplary optical switch fabric according to one embodiment of the invention. Referring to FIG. 3, exemplary switch fabric 300 includes, but is not limited to, an optical switch matrix (also referred to as an optical switch array) 302 having multiple switching elements to receive multiple input optical fibers 301, one or more variable optical attenuators (VOAs) 303, and one or more photonic detectors 305 to monitor, via one or more tap mechanisms 304, the optical signals traveling along multiple output optical fibers 306.

In one embodiment, the switch matrix 302 may be an 8×8 switch matrix that routes any one of the optical signals received by the input fibers 301 to any one of the output fibers 306 using multiple optoelectrical switches, such as, for example, directional couplers, BOA couplers, digital-optical-switches, and X or Y switches. In a typical embodiment, the switches (also referred to as optical cross-connect switches, switching elements, switching nodes, and/or switches) employed in the exemplary switch matrix 302 may be able to perform one microsecond operation (or shorter in time) with fully integrated variable optical attenuation and output optical power monitoring, which enables constant output power operation over multiple channels. In one embodiment, the switches employed within the switch matrix 302 may be manufactured using a semiconductor material and local manipulation of the refractive index by the carrier-induced plasma effect generated by appropriately placed electrodes and current injected from the application of a forward-biased voltage (closely related are the Pockels and Kerr effects that rely upon strong electric fields rather than strong electrical currents).

The switches may possess multiple functionality, such as, for example, attenuation, and power monitoring, etc. For example, according to one embodiment, at least one of the switching elements that make up the switching matrix may be capable of partially switching to divert a portion of an optical signal to one output port while routing the remaining portion of the optical signal to another output port. Note that although components 302-304 are shown as separate functional blocks, it will be appreciated that these components are integrated within each other on a single substrate (e.g., single integrated chip).

Figure 4A:
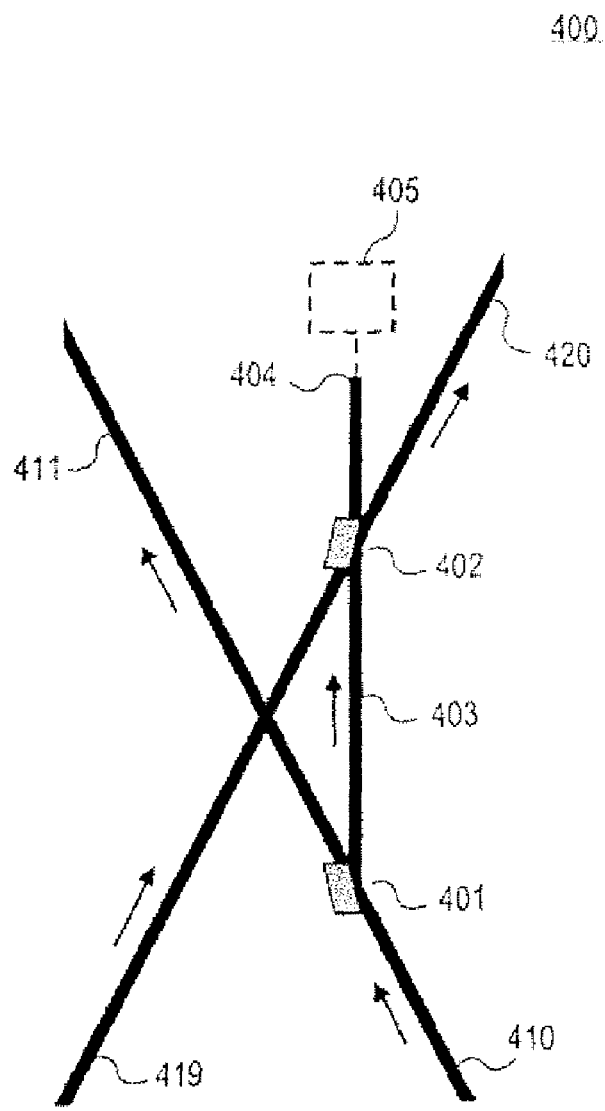
FIGS. 4A and 4B are layouts illustrating an exemplary optical switching node according to certain embodiments of the invention.

FIG. 4A is a layout illustrating an exemplary optical switching node according to one embodiment of the invention. In one embodiment, exemplary switching node (also referred to as a coupling node) 400 includes, but is not limited to, a first switching element to receive an optical signal from an incoming waveguide, an intermediate waveguide coupled to the first switching element to received the optical signal directed by the first switching element, and a second switching element coupled to the intermediate waveguide to receive the directed optical signal from the intermediate waveguide, the second switching element having a first output port and a second output port, wherein the first output port outputs at least a portion of the optical signal to an outgoing waveguide and the second output port diverts at least a portion of the optical signal for monitoring purposes.

Referring to FIG. 4A, the exemplary switching node 400 includes a first switching element 401, a second switching element 402, and an intermediate waveguide 403. The first switching element 401 receives an optical signal from an incoming waveguide 410. The first switching element 401 can either allow the optical signal to continue traveling through waveguide 411 or switches the optical signal to the intermediate waveguide 403. In one embodiment, the first switching element 401 may be capable of partially switching that allows a portion of the optical signal to continue traveling through waveguide 411, while the remaining portion of the optical signal is rerouted to the intermediate waveguide 403. In this example, the first switching element 401 is a Y switching element having one input port and two output ports. Alternatively, the first switching element 401 may be an X switching having two input ports and two output ports.

The second switching element 402 receives the optical signal from the intermediate waveguide 403 and may route the optical signal to another waveguide 420. In one embodiment, the second switching element 402 may be an X switching element having two input ports and two output ports. According to one embodiment, one of the output ports is coupled to the outgoing waveguide 420, while the other output port 404 may be used for other purposes, such as, monitoring or testing purposes. In one embodiment, the second switching element 402 is capable of partially switching to divert a portion of the optical signal received from the intermediate waveguide 403 to the outgoing waveguide 420, while routing the remaining portion of the optical signal to the other output port 404. Optionally, according to one embodiment, one or more monitoring or testing devices 405 may be coupled to the output port 404 for monitoring and/or testing purposes. For example, device 405 may be a photonic detector that detects an optical signal received from the output port 404 and converts the received optical signal into one or more electrical signals for the purposes of monitoring and/or testing purposes. In a particular embodiment, the device 405 may be photo diode device.

Figure 4B:
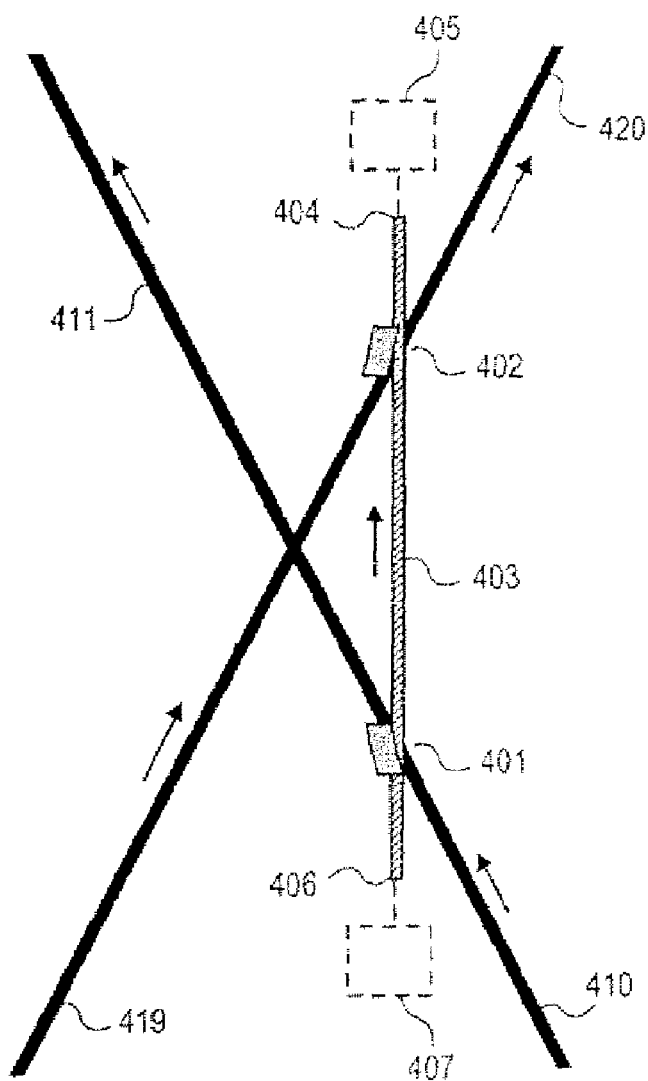

FIG. 4B is a layout of illustrating an exemplary optical switching node according to an alternative embodiment of the invention. In this embodiment, both switching elements 401 and 402 are switching elements having multiple input ports and multiple output ports, such as, for example, X switching elements. As a result, one or more monitoring and/or testing devices 405 and 407 may be coupled to the auxiliary output ports 404 and 406 respectively. The monitoring and/or testing devices 405 and 407 may be a photonic detector, such as, for example, a photo diode. Other configurations may exist.

Figure 5A:
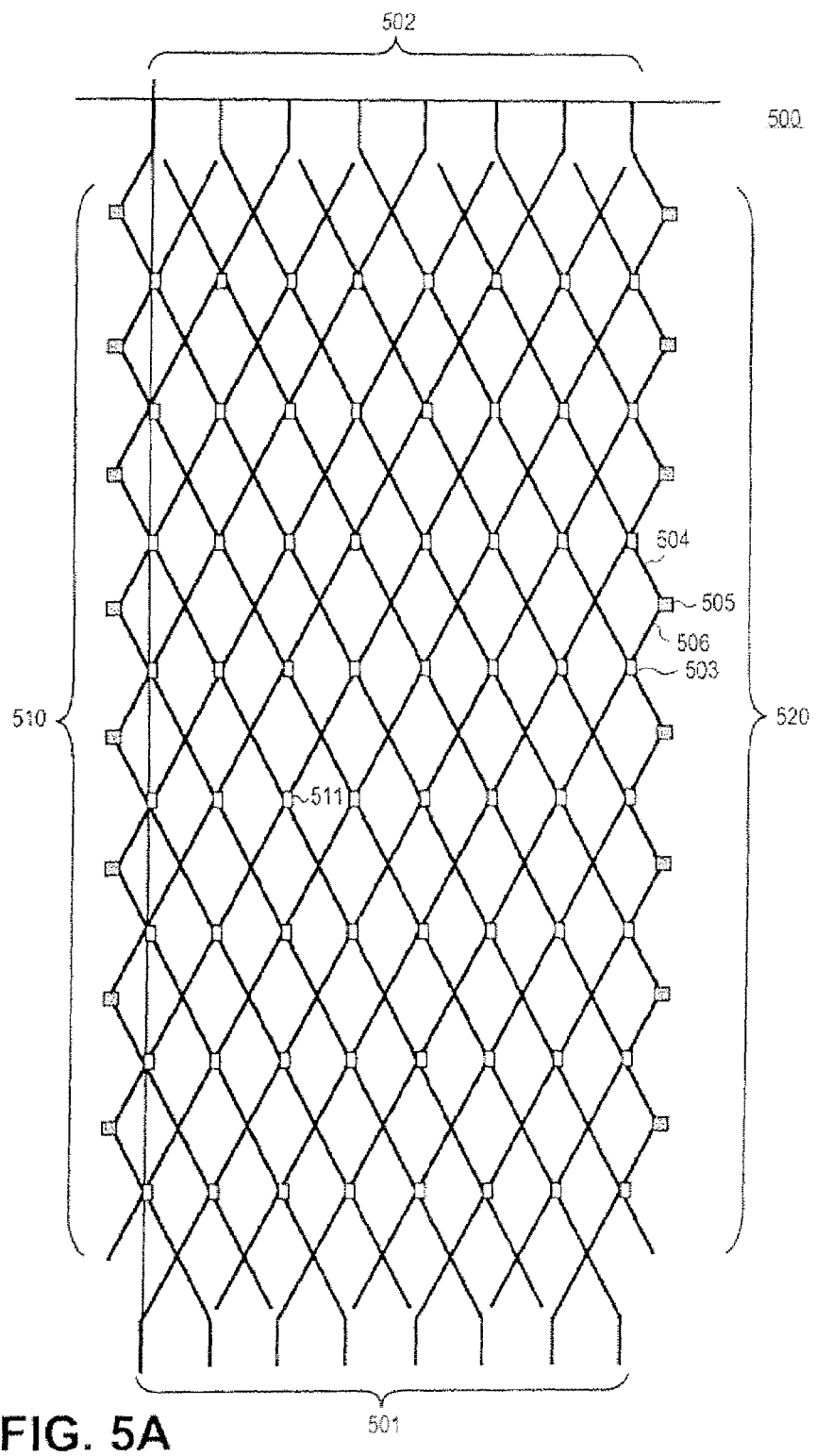
FIGS. 5A-5B are layouts illustrating a plain view of exemplary optical switch matrix architecture according to one embodiment of the invention.

FIG. 5A is a layout illustrating a plain view of exemplary optical switch matrix architecture according to one embodiment of the invention. In one embodiment, the exemplary switch matrix 500 includes, but is not limited to, multiple input waveguides disposed on an input side of the matrix, multiple output waveguides disposed on an output side of the matrix, multiple switching elements and intermediate waveguides to interconnect any one of the input waveguides and any one of the output waveguides, and multiple lateral side elements disposed on one or more lateral sides other than the input and output side of the matrix, each of the lateral side elements inwardly directing an optical signal received from one of the input waveguides towards one of the output waveguides via at least a portion of the plurality of switching elements and intermediate waveguides.

In another embodiment, the exemplary switch matrix 500 includes, but is not limited to, N input waveguides disposed on an input side of the matrix, N being an integer greater than 2, N output waveguides disposed on an output side of the matrix, multiple switching elements and intermediate waveguides to interconnect any one of the N input waveguides and any one of the N output waveguides, where an optical signal received at one of the N input waveguides reaches one of the N output waveguides via N switching elements of the multiple switching elements.

Referring to FIG. 5A, the exemplary switch matrix 500 includes an input side where multiple input waveguides 501 are disposed and an output side where multiple output waveguides 502 are disposed. The input waveguides 501 are used to receive input optical signals. The input optical signal may be one of the wavelengths (also referred to as lambdas), for example, in a wavelength division multiplex (WDM) network or a dense WDM (WDM) network. The switch matrix 500 may also be referred to as N×N switch matrix, where there are N input waveguides and N output waveguides. In a particular embodiment, there are 8 inputs and 8 outputs. It will be appreciated that more or less inputs and/or outputs may be implemented.

An optical signal from any one of the input waveguides 501 may be routed to any one of the output waveguides 502 via one or more optical switching elements such as switching element 503 and one or more intermediate waveguides between the input waveguides 501 and output waveguides 502, such as, for example, intermediate waveguides 504 and 506. The elements disposed on the lateral sides 510 and 520 other than the input and output sides 501 and 502 may be referred to as lateral side elements. The elements disposed within the input and output sides 501-502, and the lateral sides 510 and 520 may be referred to as interior elements. For example, switching element 511 may be referred to as one of the interior elements, while element 505 may be referred to as a lateral side element. The layout 500 shown in FIG. 5A may also be referred to as a colinear layout, which forms a rectangular photonic-integrated-circuit chip that is long and narrow.

Some of the switching elements of FIG. 5A may include one or more physical switches (e.g., sub-switches) therein. In one embodiment, the switching elements may be total internal reflection (TIR) switches which may be implemented based on a carrier injection technology in a semiconductor material. In one embodiment, some of the switching elements may be able to function as variable optical attenuators (VOAs), in addition to the normal switching functionality. For example, according to one embodiment, a switching element may include multiple output ports, such as, for example, a first output port and a second output port. The switching element may be capable of partially switching to divert at least a portion of the optical signal received from an input port of the switching element to a first output port, while directing the remaining portion of the optical signal to the second output port. As a result, the switching element functions as a part of a VOA.

Figure 1A:
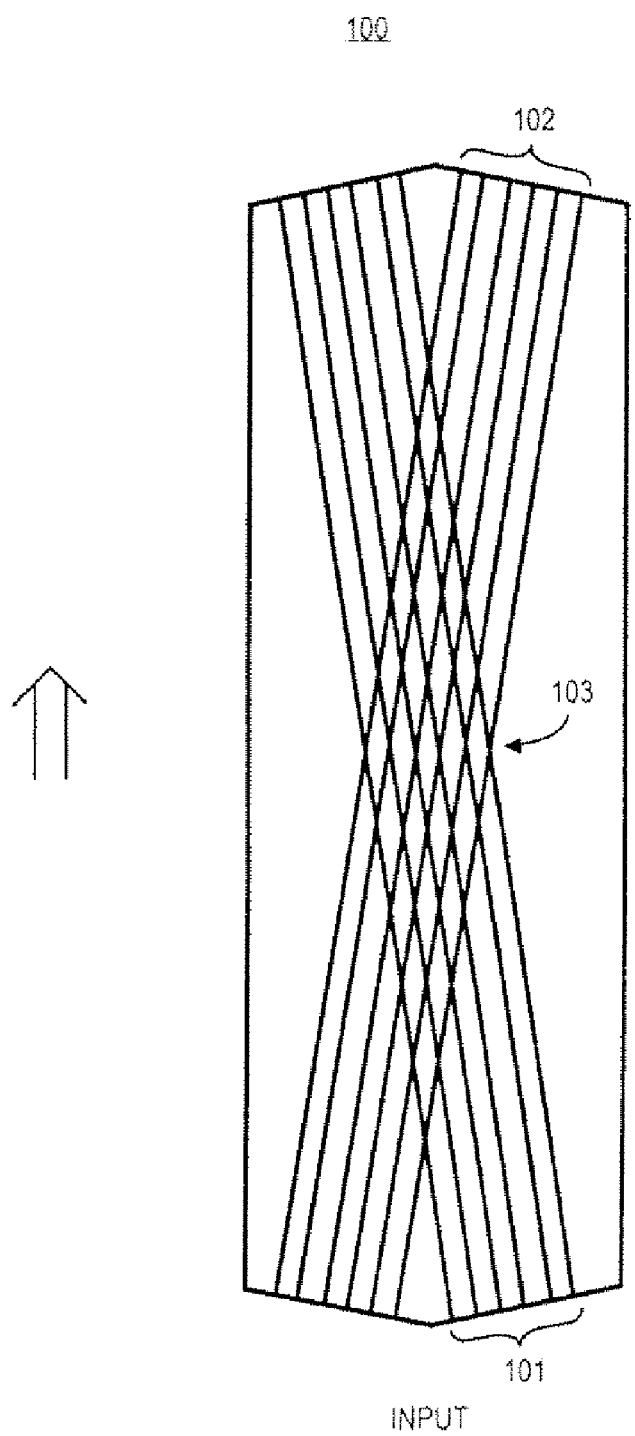
FIG. 1A is a layout illustrating a typical switch array having crossbar geometry.
Figure 1B:
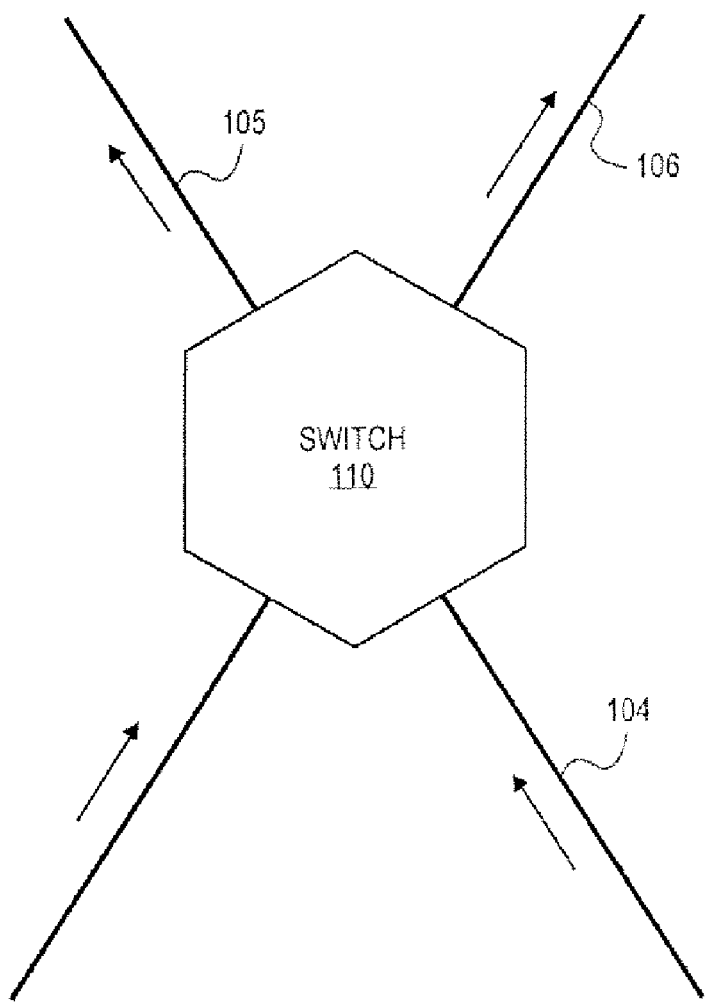
FIG. 1B is a layout illustrating a typical X switching element, which may be used in one embodiment of the invention.
Figure 2A:
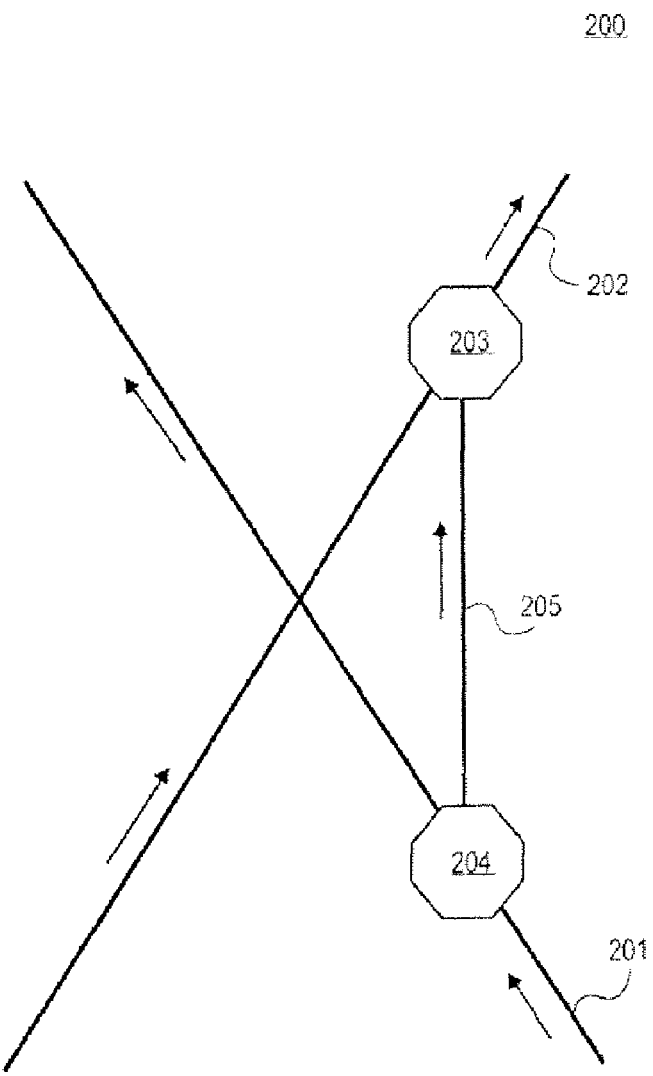
FIG. 2A is a layout illustrating a typical double crossbar switching element, which may be used in one embodiment of the invention.
Figure 2B:
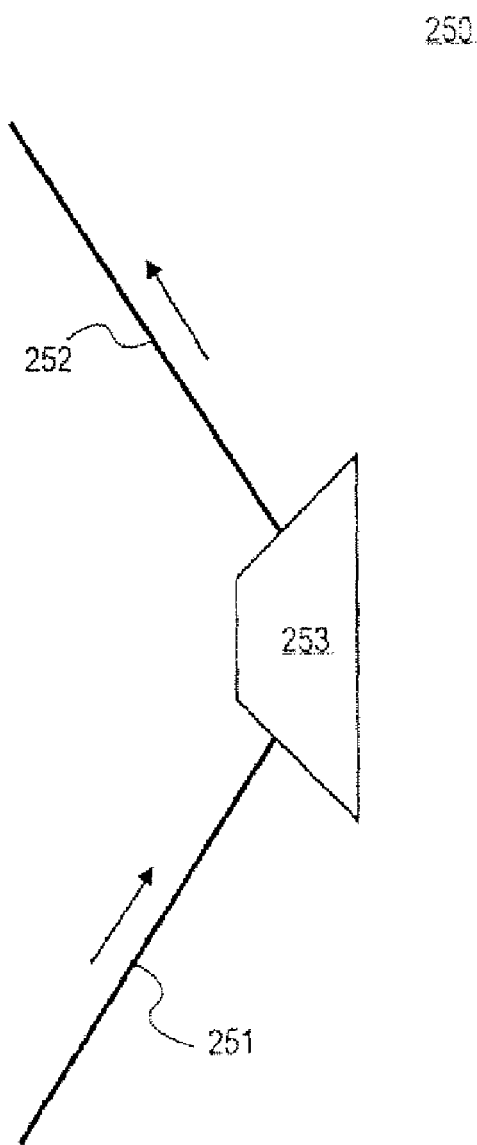
FIG. 2B is a layout illustrating a typical optical mirror, which may be used in one embodiment of the invention.

In one embodiment, a switching element may be an X switch having two input ports and two output ports, such as, for example, switching node 103 of FIG. 1B. Alternatively, a switching element may be a Y switch having one input port and two output ports, or one output port and two input ports, similar to those shown in FIG. 2A. According to one embodiment, one of the output ports may be used as an auxiliary output port and one of the input ports may be used as an auxiliary input port. An auxiliary input optical signal may be fed into the auxiliary input port and routed to the corresponding regular output port, while blocking the regular input optical signal from the same output port (e.g., similar to add/drop functions).

In one embodiment, a photonic detector may be coupled to an output port of some switching elements, where the photonic detector may receive a portion of an optical signal that has been diverted by the respective switching element and convert the received optical signal into one or more electrical signals for a variety of purposes, such as, for example, monitoring and/or diagnostic purposes. In one embodiment, the photonic detector may be a photo diode.

Figure 5B:
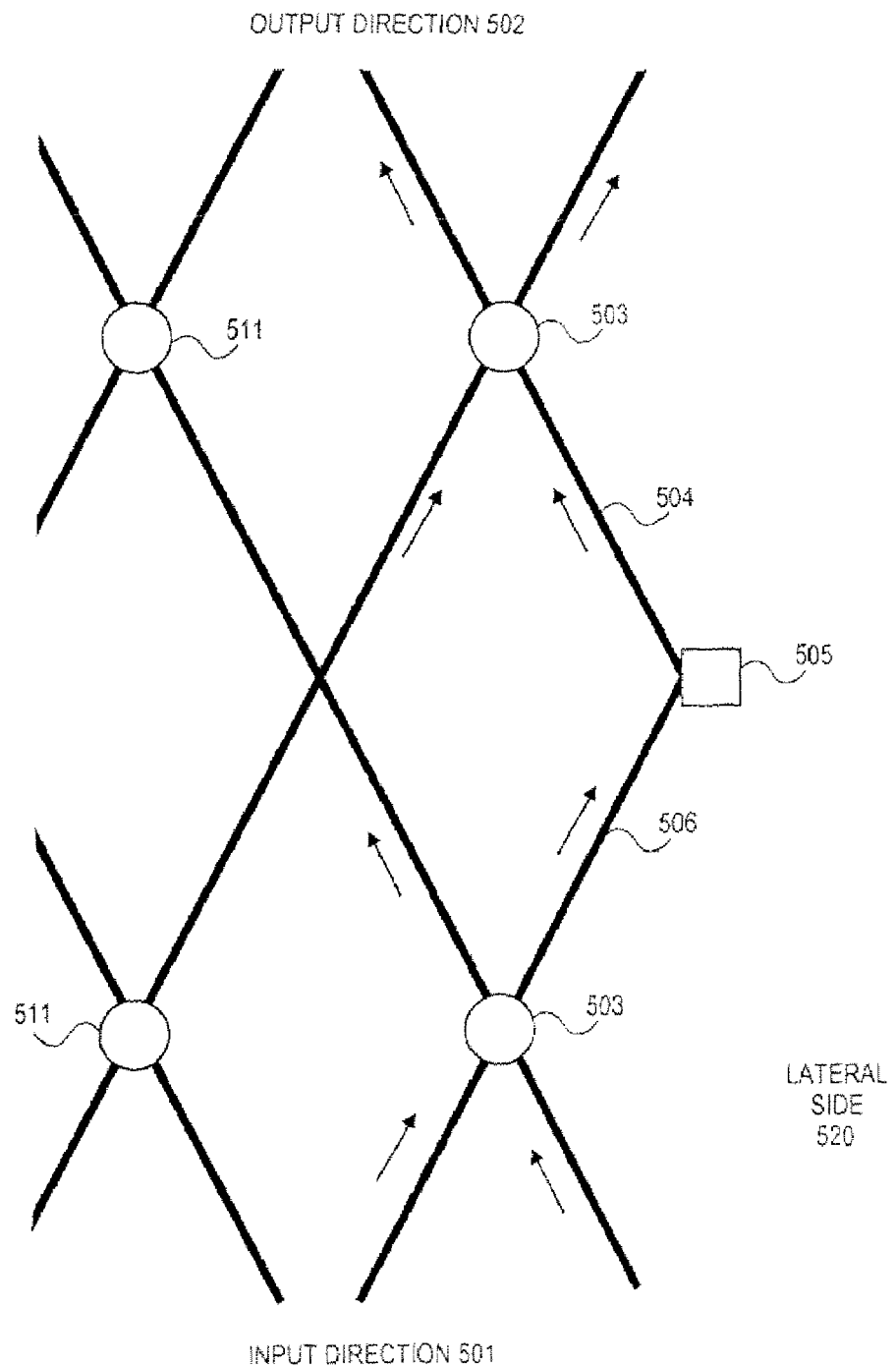

Referring to FIG. 5A, according to one embodiment, on the edges or sides other than the input and output sides (e.g., lateral sides), one or more lateral side elements 505 may be used to change the direction of the optical signals along the respective edge towards the output side. In one embodiment, the lateral side element 505 may be an optical mirror. In one embodiment, the optical mirrors may be waveguide TIR mirrors. A waveguide TIR mirror uses an interface with air to generate the TIR effect. Other elements or configurations may be implemented. FIG. 5B is an enlarged version of a portion of the switch matrix shown in FIG. 5A.

Figure 6A:
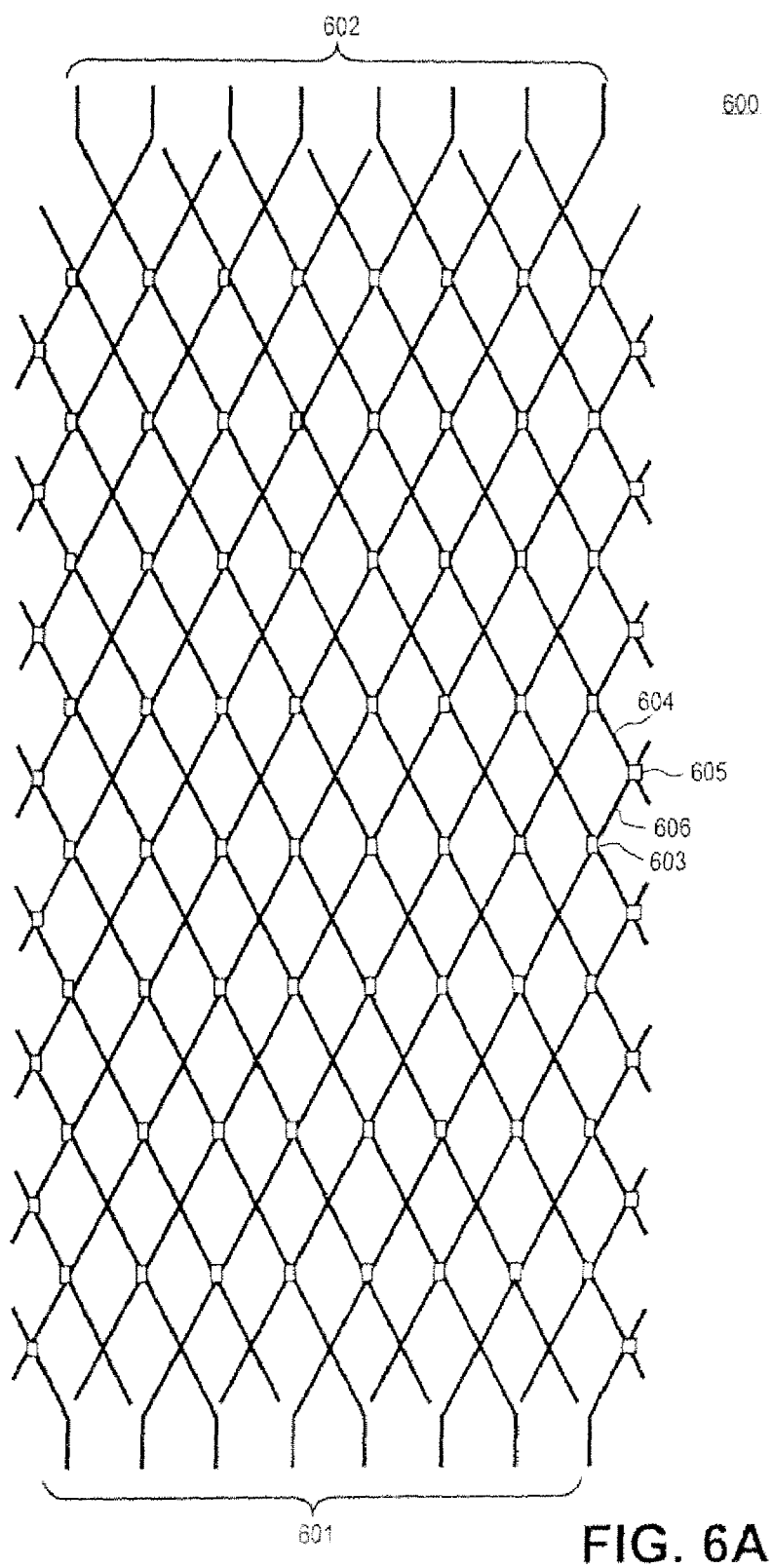
FIGS. 6A-6B are layouts illustrating a plain view of exemplary optical switch matrix architecture according to an alternative embodiment of the invention.

FIG. 6A is a layout illustrating a plain view of exemplary optical switch matrix architecture according to an alternative embodiment of the invention. Referring to FIG. 6A, the exemplary switch matrix 600 includes an input side where multiple input waveguides 601 are disposed and an output side where multiple output waveguides 602 are disposed. The input waveguides 601 are used to receive input optical signals. The input optical signal may be one of the wavelengths (also referred to as lambdas), for example, in a wavelength division multiplex (WDM) network or a dense WDM (DWDM) network. The switch matrix 600 may also be referred to as N×N switch matrix, where there are N input waveguides and N output waveguides.

An optical signal from any one of the input waveguides 601 may be routed to any one of the output waveguides 602 via one or more optical switching elements such as switching element 603 and one or more intermediate waveguides between the input waveguides 601 and output waveguides 602, such as, for example, intermediate waveguides 604 and 606.

Some of the switching elements of FIG. 6A may include one or more physical switches (e.g., sub-switches) therein. In one embodiment, the switching elements may be total internal (TIR) switches which may be implemented based on a carrier injection technology in a semiconductor material. In one embodiment, some of the switching elements may be able to function as variable optical attenuators (VOAs), in addition to the normal switching functionality. For example, according to one embodiment, a switching element may include multiple output ports, such as, for example, a first output port and a second output port. The switching element may be capable of partially switching to divert at least a portion of the optical signal received from an input port of the switching element to a first output port, while directing the remaining portion of the optical signal to the second output port. As a result, the switching element functions as a part of a VOA.

In one embodiment, a switching element may be an X switch having two input ports and two output ports, such as, for example, switching node 103 of FIG. 1B. Alternatively, a switching element may be a Y switch having one input port and two output ports, or one output port and two input ports, similar to those shown in FIG. 2A. According to one embodiment, one of the output ports may be used as an auxiliary output port and one of the input ports may be used as an auxiliary input port. An auxiliary input optical signal may be fed into the auxiliary input port and routed to the corresponding regular output port, while blocking the regular input optical signal from the same output port (e.g., similar to add/drop functions).

In one embodiment, a photonic detector may be coupled to an output port of some switching elements, where the photonic detector may receive a portion of an optical signal that has been diverted by the respective switching element and convert the received optical signal into one or more electrical signals for a variety of purposes, such as, for example, monitoring and/or diagnostic purposes. In one embodiment, the photonic detector may be a photo diode.

In this example, instead of using optical mirrors as the lateral side elements on the lateral sides as shown in FIGS. 5A and 5B, one or more additional switching elements, such as switching element 605, may be used to direct the optical signals from one direction to another direction.

Figure 6B:
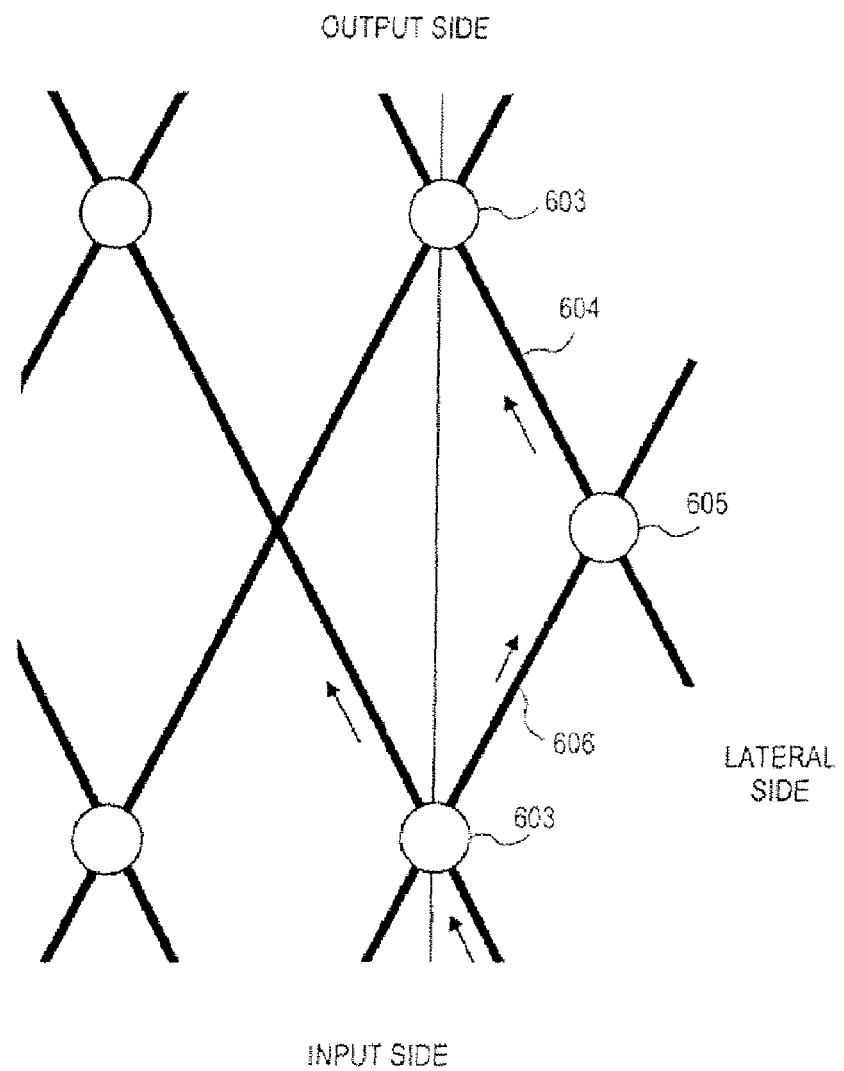

FIG. 6B is an enlarged version of a portion of the switch matrix shown in FIG. 6A. Switching element 605 may have one or more characteristics described above. For example, switching element 605 may include multiple output ports and the switching element 605 may be capable of partially switching that directs a portion of the optical signal to one or more output ports. In one embodiment, one of the output ports of switching element 605 may be coupled to a photonic detector that receives at least a portion of the optical signal for a variety of purposes, such as, for example, monitoring and/or diagnostic purposes. Alternatively, one of the output ports may be used as an auxiliary output, in addition to the regular outputs. Other elements or configurations may be implemented.

Figure 7A:
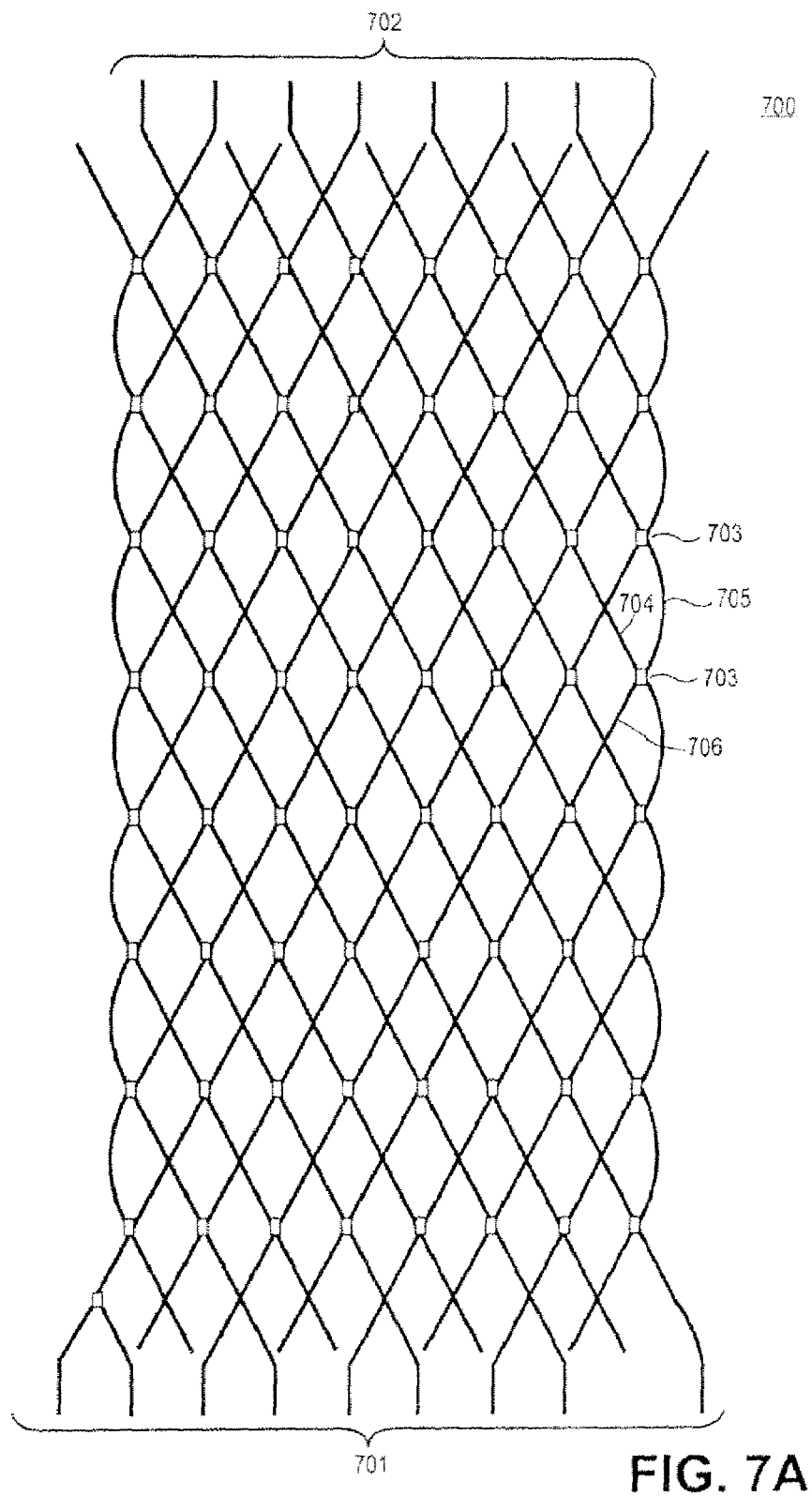
FIGS. 7A-7B are layouts illustrating a plain view of exemplary optical switch matrix architecture according to another alternative embodiment of the invention.

FIG. 7A is a layout illustrating a plain view of exemplary optical switch matrix architecture according to another alternative embodiment of the invention. Referring to FIG. 7A, the exemplary switch matrix 700 includes an input side where multiple input waveguides 701 are disposed and an output side where multiple output waveguides 702 are disposed. The input waveguides 701 are used to receive input optical signals. The input optical signal may be one of the wavelengths (also referred to as lambdas), for example, in a wavelength division multiplex (WDM) network or a dense WDM (WDM) network. The switch matrix 700 may also be referred to as N×N switch matrix, where there are N input waveguides and N output waveguides.

An optical signal from any one of the input waveguides 701 may be routed to any one of the output waveguides 702 via one or more optical switching elements such as switching element 703 and one or more intermediate waveguides between the input waveguides 701 and output waveguides 702, such as, for example, intermediate waveguides 704 and 706.

Some of the switching elements of FIG. 7A may include one or more physical switches (e.g., sub-switches) therein. In one embodiment, the switching elements may be total internal reflection (TIR) switches which may be implemented based on a carrier injection technology in a semiconductor material. In one embodiment, some of the switching elements may be able to function as variable optical attenuators (VOAs), in addition to the normal switching functionality. For example, according to one embodiment, a switching element may include multiple output ports, such as, for example, a first output port and a second output port. The switching element may be capable of partially switching to divert at least a portion of the optical signal received from an input port of the switching element to a first output port, while directing the remaining portion of the optical signal to the second output port. As a result, the switching element functions as a part of a VOA.

In one embodiment, a switching element may be an X switch having two input ports and two output ports, such as, for example, switching node 103 of FIG. 1B. Alternatively, a switching element may be a Y switch having one input port and two output ports, or one output port and two input ports, similar to those shown in FIG. 2A. According to one embodiment, one of the output ports may be used as an auxiliary output port and one of the input ports may be used as an auxiliary input port. An auxiliary input optical signal may be fed into the auxiliary input port and routed to the corresponding regular output port, while blocking the regular input optical signal from the same output port (e.g., similar to add/drop functions).

In one embodiment, a photonic detector may be coupled to an output port of some switching elements, where the photonic detector may receive a portion of an optical signal that has been diverted by the respective switching element and convert the received optical signal into one or more electrical signals for a variety of purposes, such as, for example, monitoring and/or diagnostic purposes. In one embodiment, the photonic detector may be a photo diode.

Figure 7B:
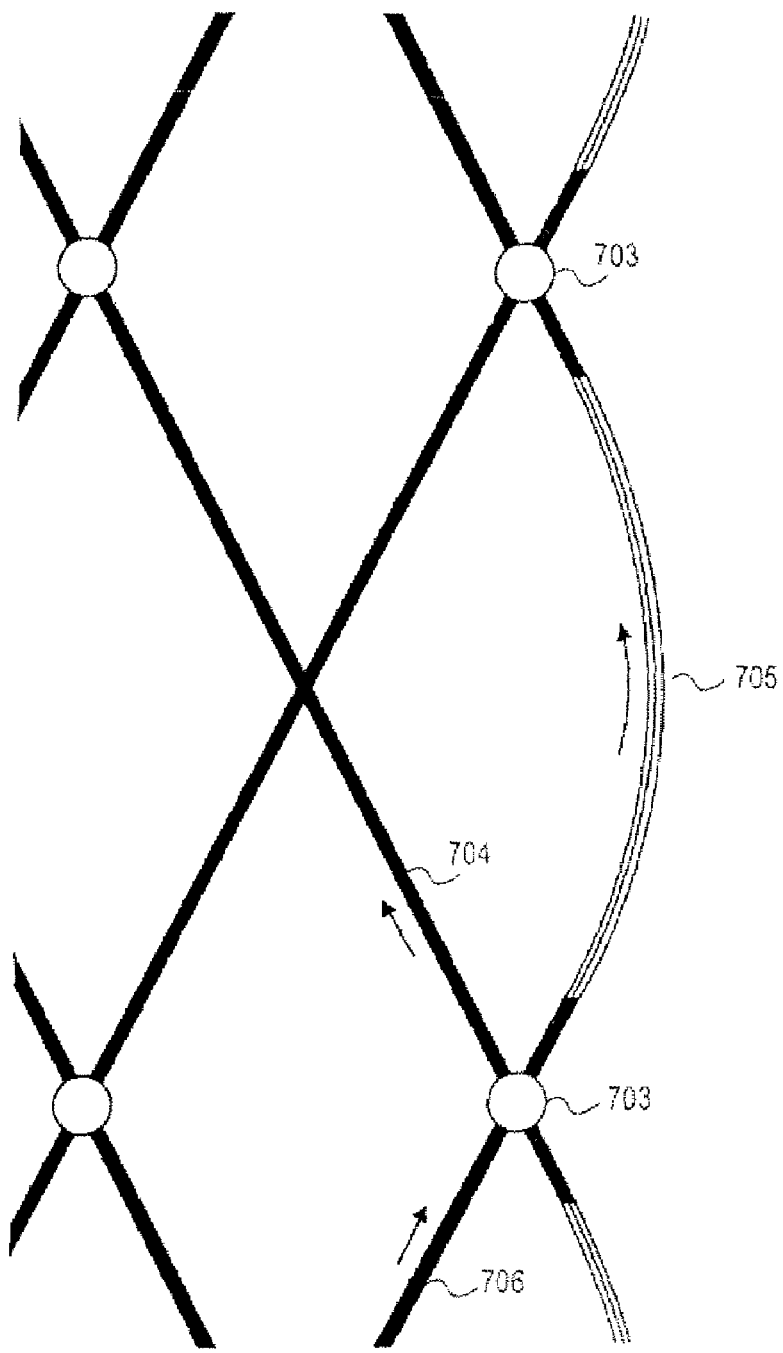

In this example, instead of using optical mirrors on the edges other than the input and output sides as shown in FIGS. 5A and 5B, or the additional switching elements as shown in FIGS. 6A and 6B, one or more waveguide bends, such as waveguide bend 705, may be used to direct the optical signals from one direction to another direction. Other elements or configurations may be implemented. FIG. 7B is an enlarged version of a portion of the switch matrix shown in FIG. 7A.

Figure 8A:
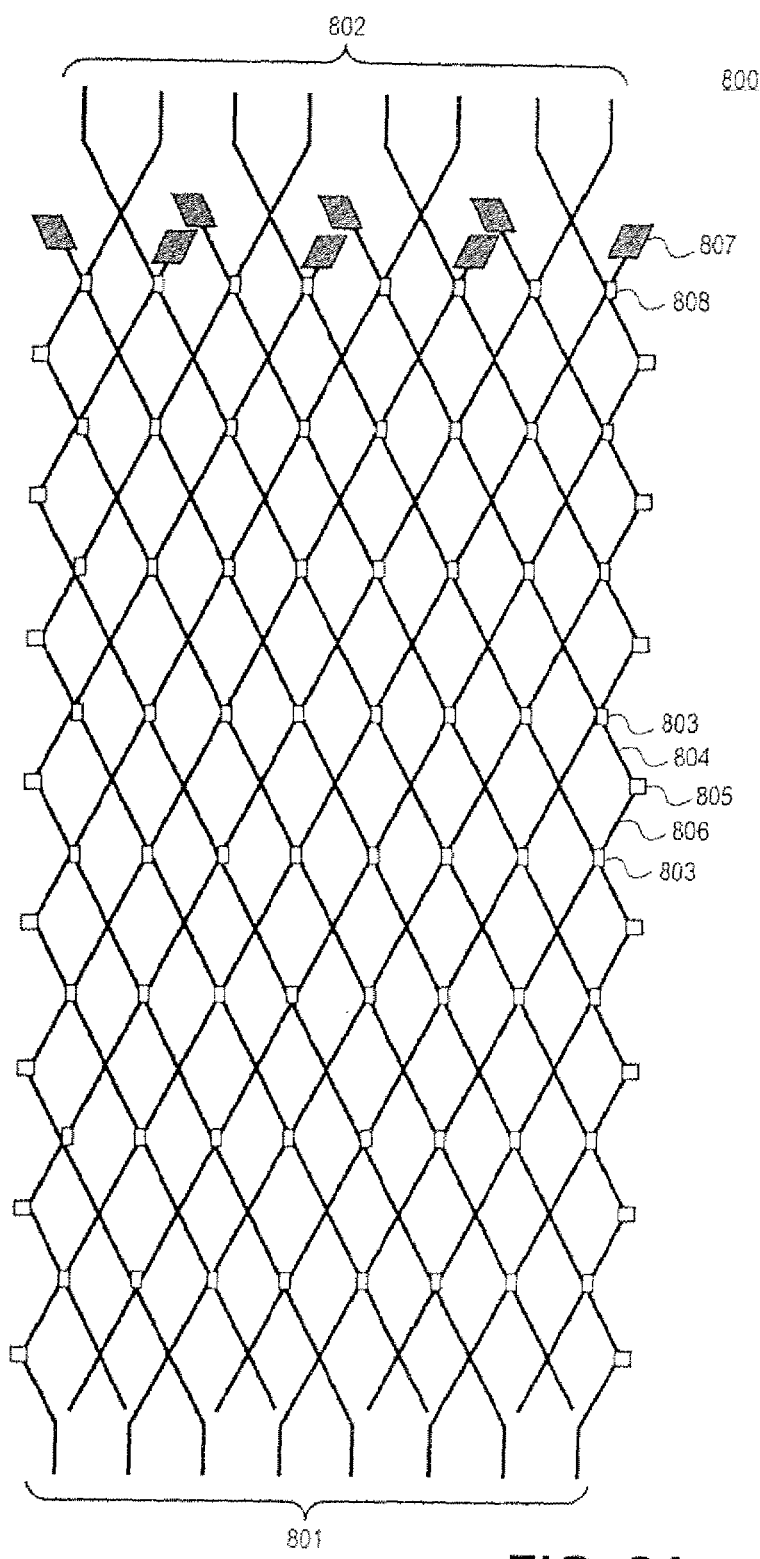
FIGS. 8A-8B are layouts illustrating a plain view of exemplary optical switch matrix architecture according to another embodiment of the invention.

FIG. 8A is a layout illustrating a plain view of exemplary optical switch matrix architecture according to one embodiment of the invention. In one embodiment, the exemplary switch matrix 800 includes, but is not limited to, multiple input waveguides disposed on an input side of the matrix, multiple output waveguides disposed on an output side of the matrix, multiple switching elements and intermediate waveguides to interconnect any one of the input waveguides and any one of the output waveguides, each of the switching elements having a first output port and a second output port, where at least one of the switching elements adjacent to one of the output waveguides is capable of partially switching to divert at least a portion of an optical signal to the first output port while routing a remainder of the optical signal to the second output port, and for at least one of the switching elements adjacent to one of the output waveguides, a photonic detector coupled to the first output port while an output waveguide is coupled to the second output port.

Referring to FIG. 8A, similar to the structure shown in FIG. 5A, the exemplary switch matrix 800 includes an input side where multiple input waveguides 801 are disposed and an output side where multiple output waveguides 802 are disposed. The input waveguides 801 are used to receive input optical signals. The input optical signal may be one of the wavelengths (also referred to as lambdas), for example, in a wavelength division multiplex (WDM) network or a dense WDM (DWDM) network. The switch matrix 800 may also be referred to as N×N switch matrix, where there are N input waveguides and N output waveguides.

An optical signal from any one of the input waveguides 801 may be routed to any one of the output waveguides 802 via one or more optical switching elements such as switching element 803 and one or more intermediate waveguides between the input waveguides 801 and output waveguides 802, such as, for example, intermediate waveguides 804 and 806. Some of the switching elements of FIG. 8 may include one or more characteristics of switching elements shown in FIGS. 5A and 5B.

According to one embodiment, on the edges or sides other than the input and output sides, one or more optical mirrors, such as optical mirror 805, may be used to change the direction of the optical signals along the respective edge towards the output side. In one embodiment, the optical mirrors may be waveguide TIR mirrors. A waveguide TIR mirror uses an interface with air to generate the TIR effect.

Figure 8B:
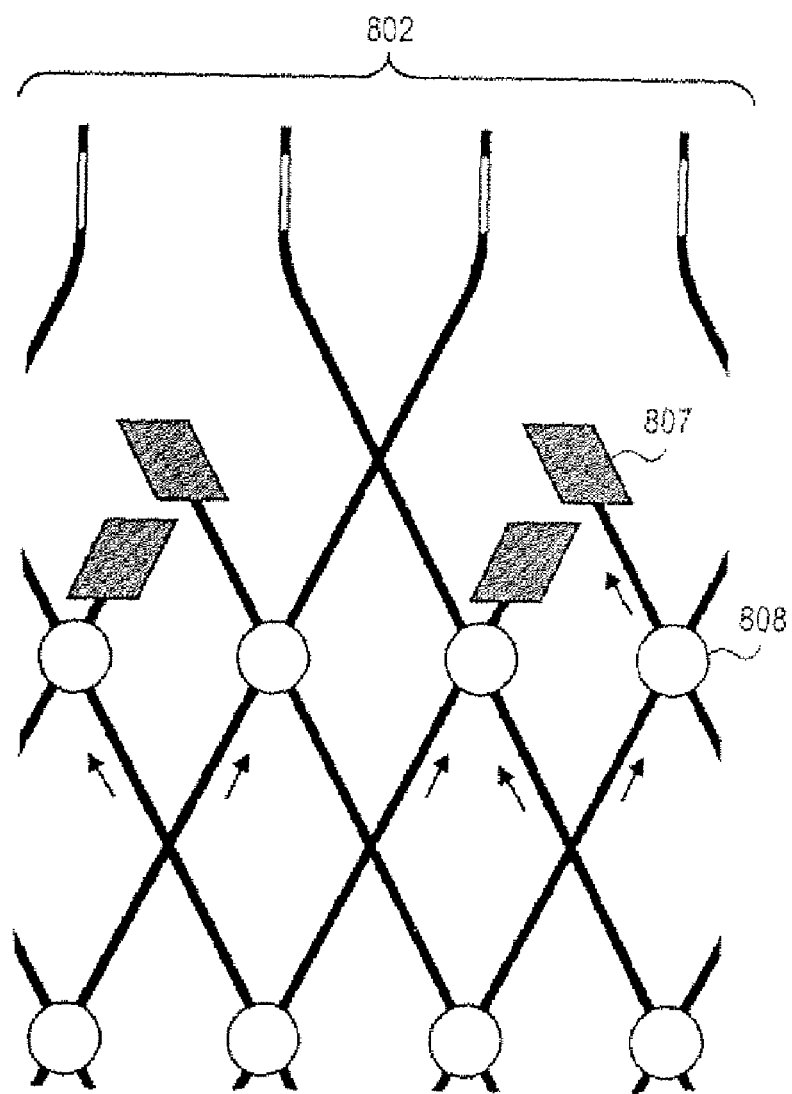

In addition, according to one embodiment, one or more switching elements that are immediately adjacent to or directly coupled to one or more output waveguides 802, such as, for example, switching element 808, may include multiple output ports. One of the output ports may be coupled to one of the output waveguides 802 while another one of the output ports may be coupled to a photonic detector, such as, for example, photonic detector 807. The photonic detector may receive a portion of an optical signal that has been diverted by the respective switching element and convert the received optical signal into one or more electrical signals for a variety of purposes, such as, for example, monitoring and/or diagnostic purposes. Other elements or configurations may be implemented. FIG. 8B is an enlarged version of a portion of the structure shown in FIG. 8A.

Figure 9A:
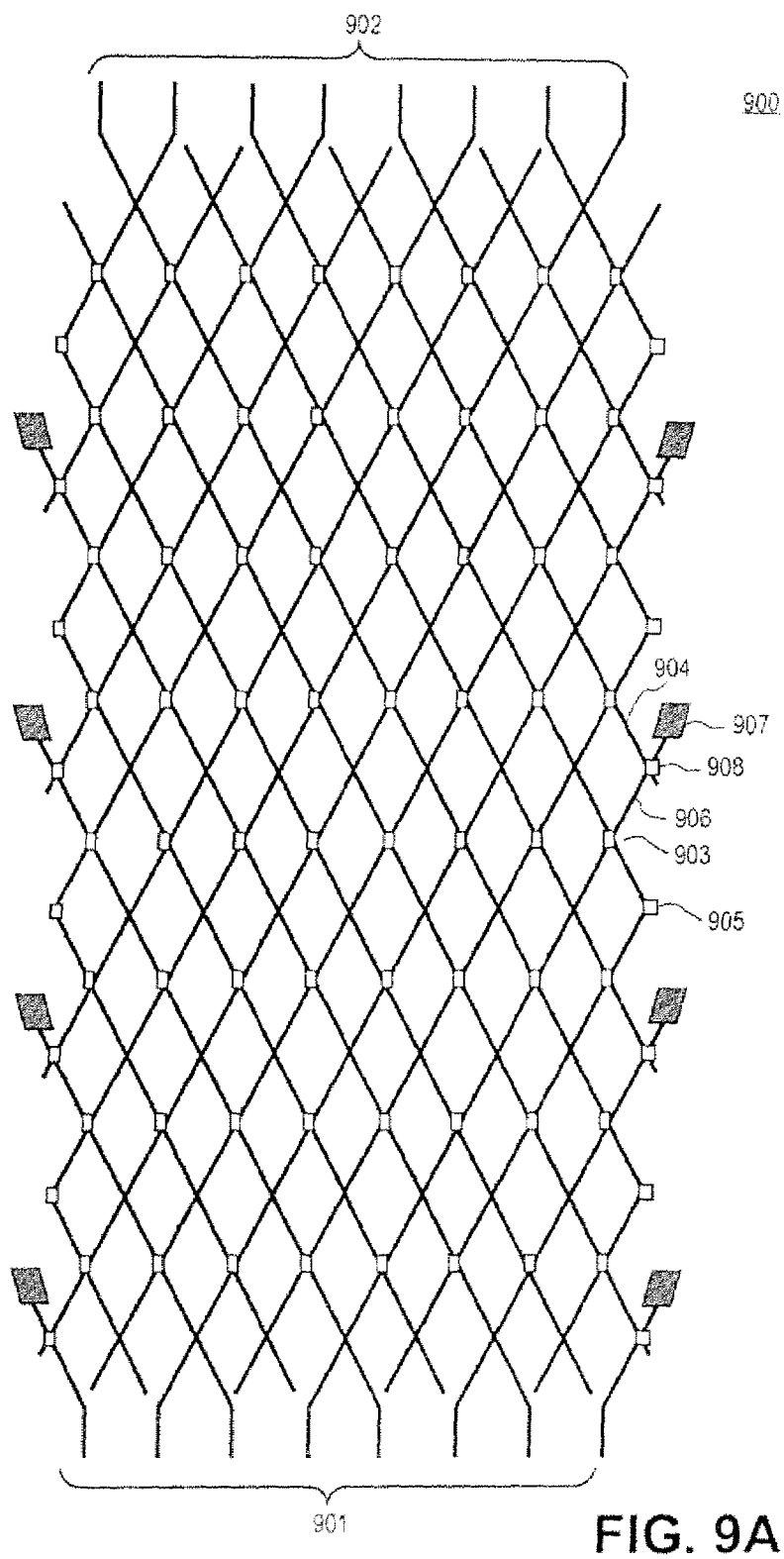
FIGS. 9A-9B are layouts illustrating a plain view of exemplary optical switch matrix architecture according to another embodiment of the invention.

FIG. 9A is layout illustrating a plain view of exemplary optical switch matrix architecture according to one embodiment of the invention. In one embodiment, the exemplary switch matrix 900 includes, but is not limited to, multiple input waveguides disposed on an input side of the matrix, multiple output waveguides disposed on an output side of the matrix, multiple switching elements and intermediate waveguides to interconnect any one of the input waveguides and any one of the output waveguides, each of the switching elements having a first output port and a second output port, where at least one of the switching elements disposed along one or more sides other than the input and output sides of the matrix is capable of partially switching to divert at least a portion of an optical signal to the first output port while routing a remainder of the optical signal to the second output port, and for at least one of the switching elements that is capable of partially switching, a photonic detector coupled to the first output port while a waveguide is coupled to the second output port.

Referring to FIG. 9A, similar to the structures shown in FIGS. 5A and 6A, the exemplary switch matrix 900 includes an input side where multiple input waveguides 901 are disposed and an output side where multiple output waveguides 902 are disposed. The input waveguides 901 are used to receive input optical signals. The input optical signal may be one of the wavelengths (also referred to as lambdas), for example, in a wavelength division multiplex (WDM) network or a dense WDM (DWDM) network.

An optical signal from any one of the input waveguides 901 may be routed to any one of the output waveguides 902 via one or more optical switching elements such as switching element 903 and one or more intermediate waveguides between the input waveguides 901 and output waveguides 902, such as, for example, intermediate waveguides 904 and 906. Some of the switching elements of FIG. 9A may include one or more characteristics of switching elements described above and shown in FIGS. 5A and 6A.

According to one embodiment, on the edges or sides other than the input and output sides, one or more optical mirrors, such as optical mirror 905, may be used to change the direction of the optical signals along the respective edge towards the output side. In one embodiment, the optical mirrors may be waveguide TIR mirrors. A waveguide TIR mirror uses an interface with air to generate the TIR effect. Alternatively, some of the optical mirrors disposed on the edges other than the input and output sides may be replaced with additional switching elements, such as, for example, switching element 908. It will be appreciated that a combination of an optical mirror, an optical switch, a waveguide bend, and/or other redirection couplers may be utilized.

Figure 9B:
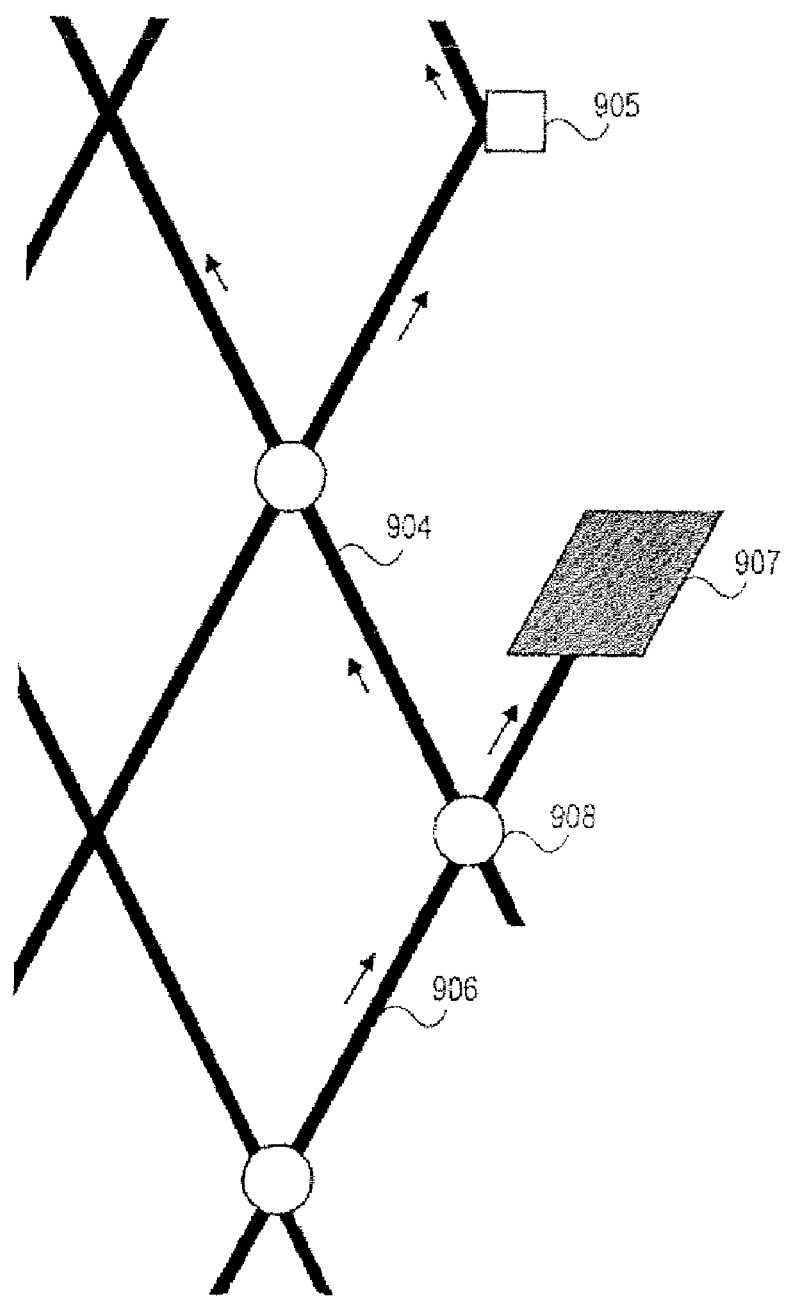

In one embodiment, switching element 908 may include multiple output ports. One of the output ports may be coupled to one of the an intermediate waveguide such as intermediate waveguide 904 or an output waveguide, while another one of the output port may be coupled to a photonic detector, such as, for example, photonic detector 907. The photonic detector may receive a portion of an optical signal that has been diverted by the respective switching element and convert the received optical signal into one or more electrical signals for a variety of purposes, such as, for example, monitoring and/or diagnostic purposes. Other elements or configurations may be implemented. FIG. 9B is an enlarged version of a portion of the structure shown in FIG. 9A.

Figure 10A:
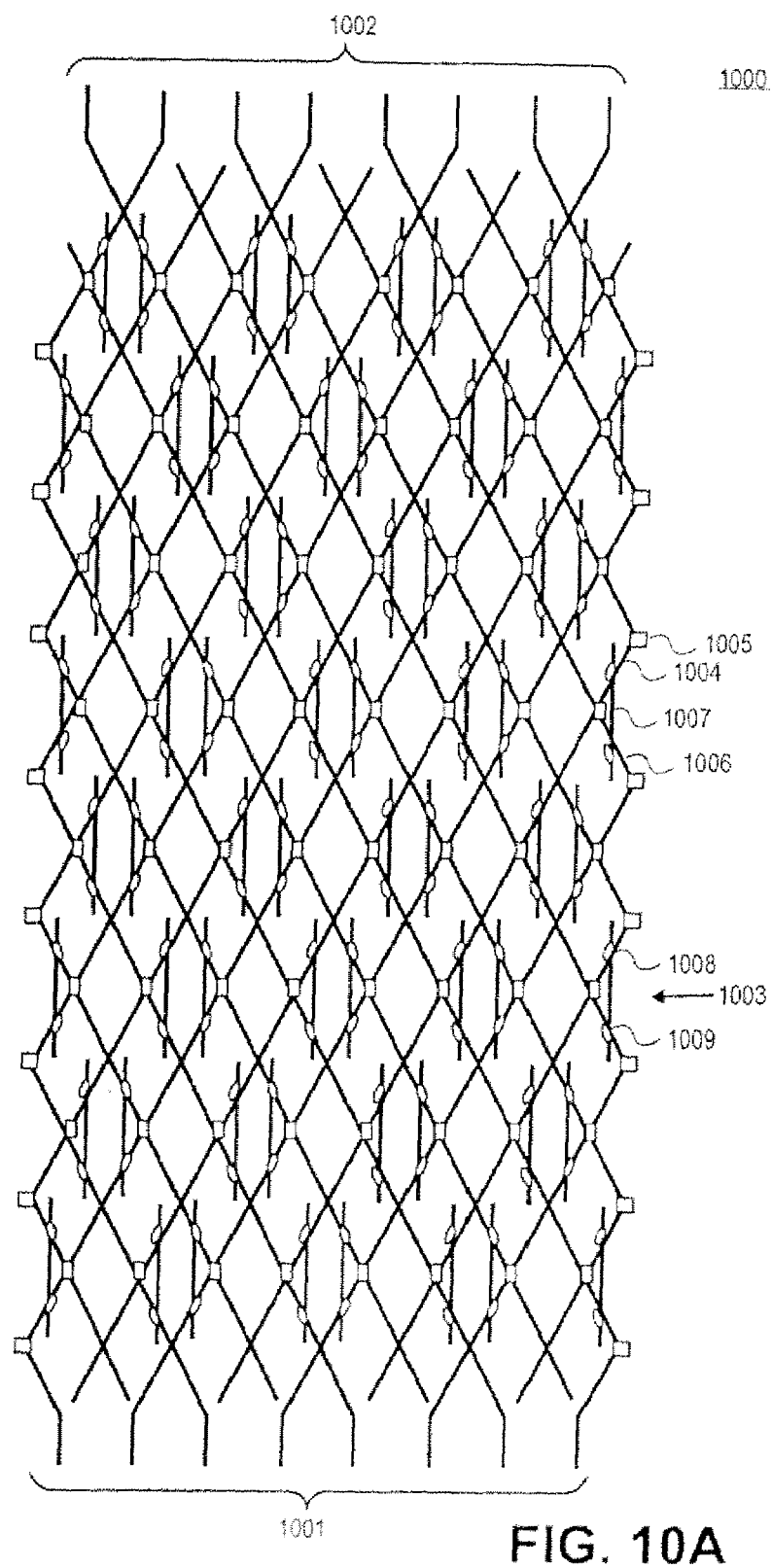
FIGS. 10A-10B are layouts illustrating a plain view of exemplary optical switch matrix architecture according to another embodiment of the invention.

FIG. 10A is layout illustrating a plain view of exemplary optical switch matrix architecture according to one embodiment of the invention. In one embodiment, the exemplary switch matrix 1000 includes, but is not limited to, multiple input waveguides, multiple output waveguides, for each of the input waveguides and each of the output waveguides, a switching node coupling the respective input waveguide and the respective output waveguide, where the switching node includes a first switch coupling the respective input waveguide to an intermediate waveguide and a second switch coupling the intermediate waveguide to the respective output waveguide, and wherein the second switch is an X switch having a first and second input ports and a first and second output ports, the first input port receiving the intermediate waveguide and the first output port coupling to the respective output waveguide.

Referring to FIG. 10A, similar to the structures shown in FIG. 5A, the exemplary switch matrix 1000 includes an input side where multiple input waveguides 1001 are disposed and an output side where multiple output waveguides 1002 are disposed. The input waveguides 1001 are used to receive input optical signals. The input optical signal may be one of the wavelengths (also referred to as lambdas), for example, in a wavelength division multiplex (WDM) network or a dense WDM (DWDM) network.

An optical signal from any one of the input waveguides 1001 may be routed to any one of the output waveguides 1002 via one or more optical switching nodes such as switching node 1003 and one or more intermediate waveguides between the input waveguides 1001 and output waveguides 1002, such as, for example, intermediate waveguides 1004 and 1006. Some of the switching elements of FIG. 10A may include one or more characteristics of switching elements described above and shown in FIG. 5A.

According to one embodiment, on the edges or sides other than the input and output sides, one or more optical mirrors, such as optical mirror 1005, may be used to change the direction of the optical signals along the respective edge towards the output side. In one embodiment, the optical mirrors may be waveguide TIR mirrors. A waveguide TIR mirror uses an interface with air to generate the TIR effect. Alternatively, some of the optical mirrors disposed on the edges other than the input and output sides may be replaced with additional switching elements and/or waveguide bends, similar to those shown in FIGS. 9A and 9B.

Figure 10B:
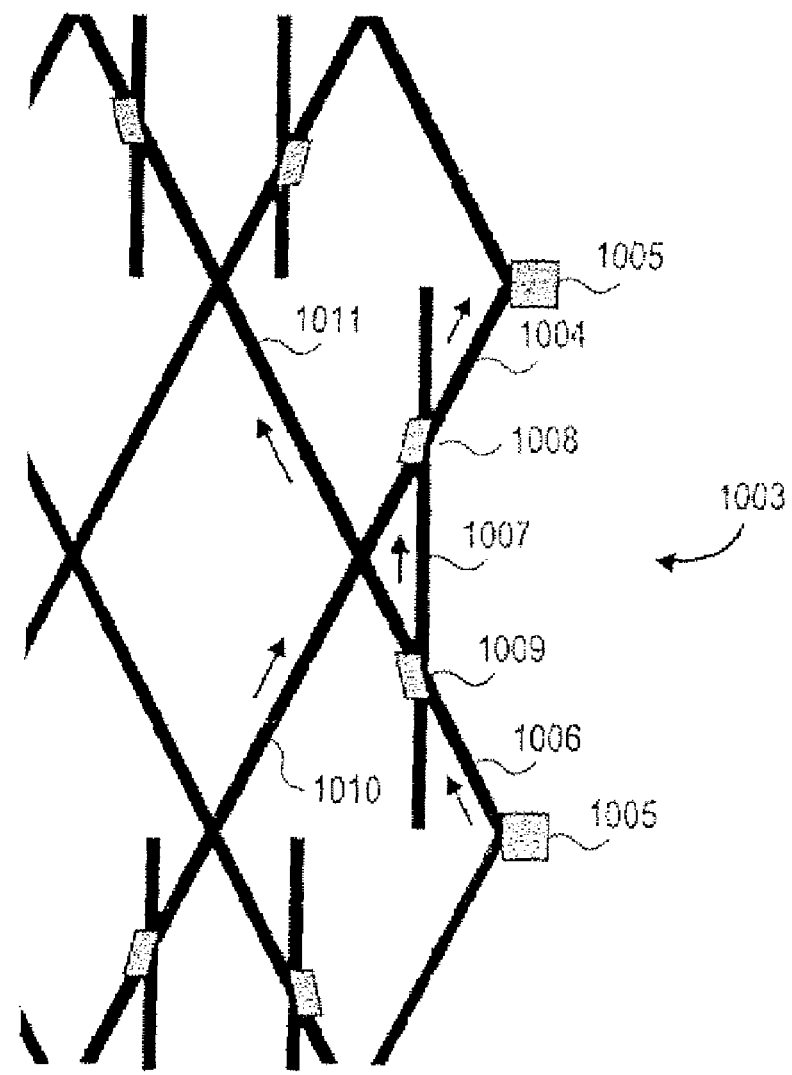

In one embodiment, switching node 1003 may include multiple switches therein. In order to route an optical signal from one waveguide to another waveguide, multiple switches within the switching node may be utilized. For example, referring to FIG. 10B, which is an enlarged version of a portion of exemplary switch matrix 1000 of FIG. 10A, in order to route an optical signal from waveguide 1006 to waveguide 1004, switches 1008 and 1009 of switching node 1003 may be utilized. That is, the optical signal traveling along waveguide 1006 may be switched onto intermediate waveguide 1007 via switch 1009. The optical signal traveling along the intermediate waveguide 1007 is then switched via the switch 1008 onto the target waveguide 1004.

In one embodiment, the switches 1008-1009 may be X switches having two input ports and two output ports, which may be able to switch optical signals along the waveguides 1010-1011. Alternatively, switches 1008-1009 may be Y switches.

In one embodiment, some of the output ports that are not used by the optical signals may be coupled to a photonic detector. The photonic detector may receive a portion of an optical signal that has been diverted by the respective switching element and convert the received optical signal into one or more electrical signals for a variety of purposes, such as, for example, monitoring and/or diagnostic purposes. Other elements or configurations may be implemented. Other configurations may be implemented.

Figure 11:
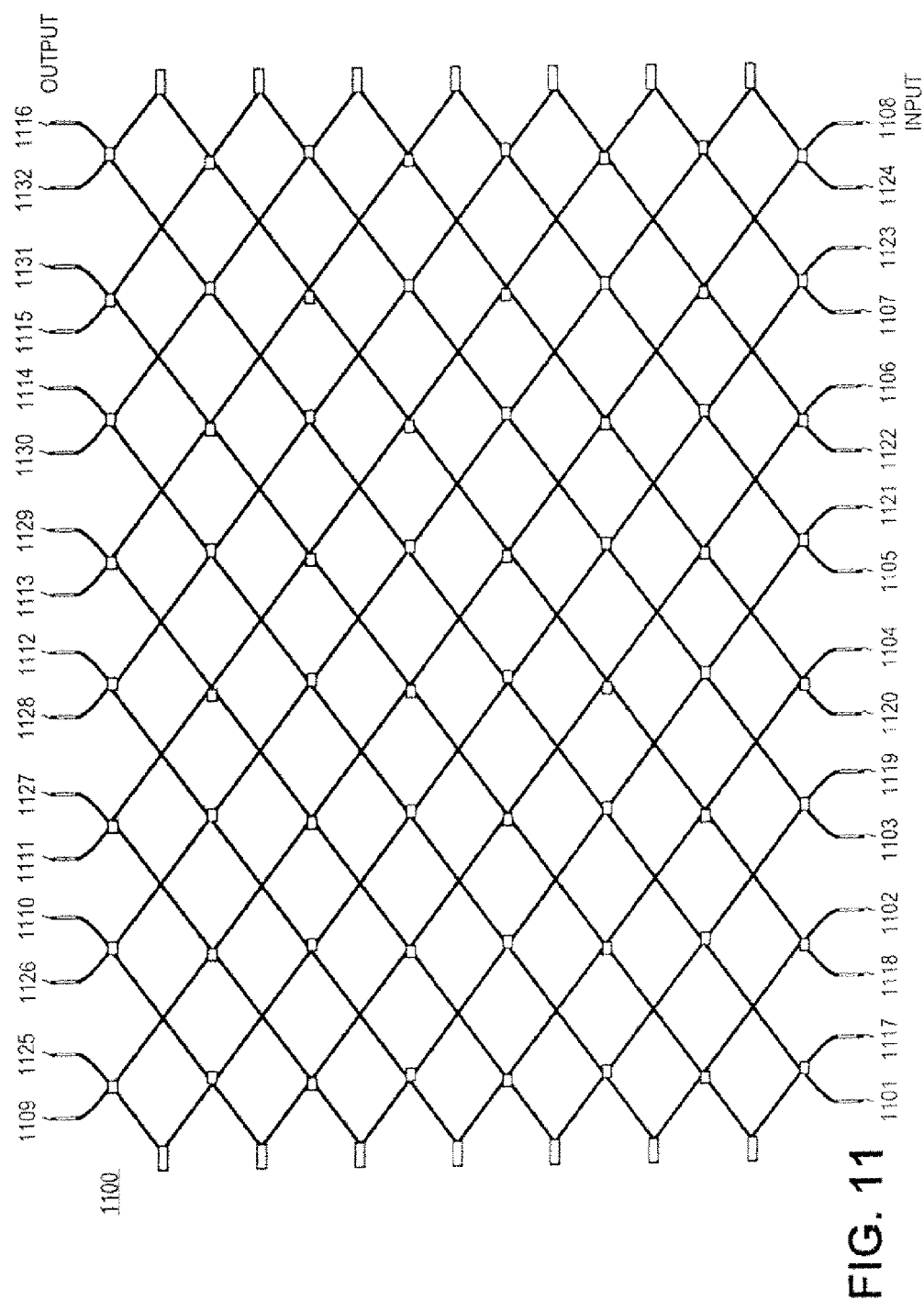
FIG. 11 is a layout illustrating a plain view of exemplary optical switch matrix architecture according to another embodiment of the invention.

FIG. 11 is a layout illustrating a plain view of exemplary optical switch matrix architecture according to another embodiment of the invention. Referring to FIG. 11, similar to the structures shown in FIGS. 5A and 5B, the exemplary switch matrix 1100 includes an input side where multiple input waveguides 1101-1108 are disposed and an output side where multiple output waveguides 1109-1116 are disposed. The input waveguides 1101-1108 are used to receive input optical signals. The input optical signal may be one of the wavelengths (also referred to as lambdas), for example, in a wavelength division multiplex (WDM) network or a dense WDM (DWDM) network.

An optical signal from any one of the input waveguides 1101-1108 may be routed to any one of the output waveguides 1109-1116 via one or more optical switching nodes and one or more intermediate waveguides between the input waveguides 1101-1108 and output waveguides 1109-1116. Some of the switching elements of FIG. 11 may include one or more characteristics of switching elements described above. For example, a switching node may be an X or a Y switching element. Alternatively, a switching node may be a double crossbar structures having an X and a Y switching elements shown in FIGS. 4A and 4B or alternatively, two Y switching elements.

In one embodiment, some of the switching elements may include multiple output ports and one of the output ports may be coupled to one or more photonic detectors. A photonic detector may receive a portion of an optical signal that has been diverted by the respective switching element and convert the received optical signal into one or more electrical signals for a variety of purposes, such as, for example, monitoring and/or diagnostic purposes. Other elements or configurations may be implemented.

In addition, an extra set of waveguides 1117-1124 on the input side may be used as auxiliary input waveguides. An auxiliary optical signal may be fed into one of the auxiliary input waveguides 1117-1124 and routed to the corresponding output waveguides 1109-1116. In the case that an auxiliary input optical signal is received, the corresponding regular input waveguide from the input waveguides 1101-1108 may effectively be blocked from any output waveguide by simply allowing it to pass through one or more switching elements to its respective alternative output 1125-1132 (e.g., auxiliary output waveguides). This configuration effectively functions similar to those performed by an add/drop multiplexer (ADM). Other configurations may be implemented.

Figure 12:
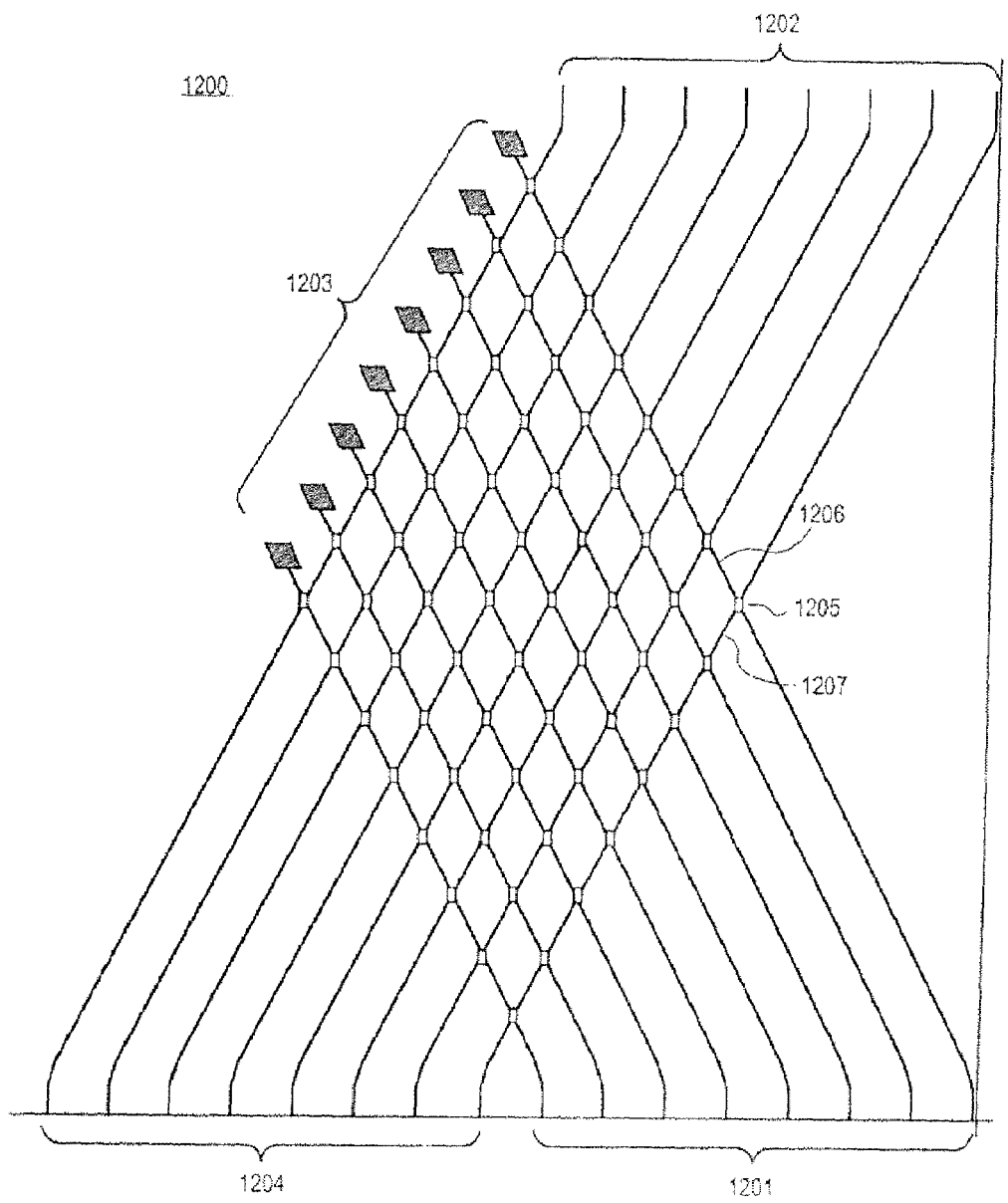
FIG. 12 is a layout illustrating a plain view of exemplary optical switch matrix architecture according to another embodiment of the invention.

FIG. 12 is a layout illustrating a plain view of exemplary optical switch matrix architecture according to one embodiment of the invention. In one embodiment, exemplary switch matrix 1200 includes, but is not limited to, multiple input waveguides and multiple output waveguides, for each of the input waveguides and each of the output waveguides, a switching element coupling the respective input waveguide and the respective output waveguide, where the switching element includes a first and second input ports and a first and second output ports, the first input port receiving the respective input waveguide and the first output port coupling to the respective output waveguide, and at least one photonic detector coupled to the second output port of at least one switching element, where the switching element is capable of partially switching to divert at least a portion of an optical signal received from one of the first and second input ports to the second output port, while allowing a remainder of the optical signal to be routed to the first output port, and where the respective photonic detector detects the portion of the optical signal from the second output port.

Referring to FIG. 12, similar to the structures shown in FIG. 1A, the exemplary switch matrix 1200 includes an input side where multiple input waveguides 1201 are disposed and an output side where multiple output waveguides 1202 are disposed. The input waveguides 1201 are used to receive input optical signals. The input optical signal may be one of the wavelengths (also referred to as lambdas), for example, in a wavelength division multiplex (WDM) network or a dense WDM (WDM) network.

An optical signal from any one of the input waveguides 1201 may be routed to any one of the output waveguides 1202 via one or more optical switching nodes such as switching node 1205 and one or more intermediate waveguides between the input waveguides 1201 and output waveguides 1202, such as, for example, intermediate waveguides 1204 and 1206. Some of the switching elements of FIG. 12 may include one or more characteristics of switching elements described above. For example, switching node 1205 may be a type of X-switch. Alternatively, switching node 1205 may include multiple switches therein, similar to the double crossbar structures shown in FIGS. 10A-10B and 11A-11B.

In one embodiment, some of the switching elements, particularly, those relatively close to the output waveguides 1202 may be coupled to one or more photonic detectors, such as, for example, photonic detectors 1203. The locations of the photonic detectors 1203 are shown for the purposes of illustrations only. Other locations may be implemented. The photonic detector may receive a portion of an optical signal that has been diverted by the respective switching element and convert the received optical signal into one or more electrical signals for a variety of purposes, such as, for example, monitoring and/or diagnostic purposes. Other elements or configurations may be implemented.

In addition, an extra set of waveguides 1204 on the input side may be used as auxiliary input waveguides. An auxiliary optical signal may be fed into one of the auxiliary input waveguides 1204 and routed to the corresponding output waveguides 1202. In the case that an auxiliary input optical signal is received, the corresponding regular input waveguide from the input waveguides 1201 may effectively be blocked from any output waveguide by simply allowing it to pass through one or more switching elements to its respective alternative output 1203. This configuration effectively functions similar to those performed by an add/drop multiplexer (ADM). Other configurations may be implemented.

Figure 13A:
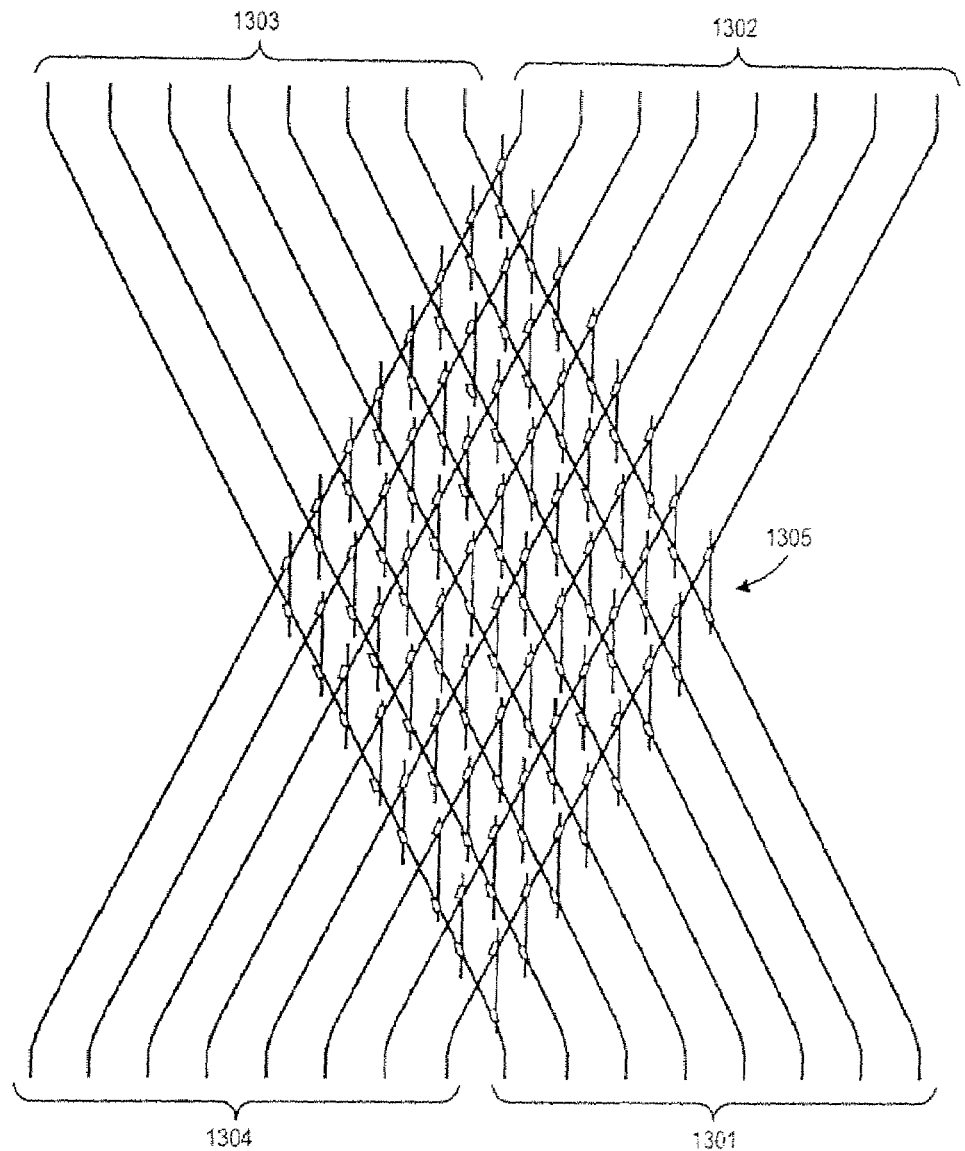
FIGS. 13A-13B are layouts illustrating a plain view of exemplary optical switch matrix architecture according to another embodiment of the invention.

FIG. 13A is a layout illustrating a plain view of exemplary optical switch matrix architecture according to one embodiment of the invention. Referring to FIG. 13A, similar to the structures shown in FIG. 12, the exemplary switch matrix 1300 includes an input side where multiple input waveguides 1301 are disposed and an output side where multiple output waveguides 1302 are disposed. The input waveguides 1301 are used to receive input optical signals. The input optical signal may be one of the wavelengths (also referred to as lambdas), for example, in a wavelength division multiplex (WDM) network or a dense WDM (DWDM) network. Input waveguides 1304 may be used as auxiliary input waveguides.

Figure 13B:
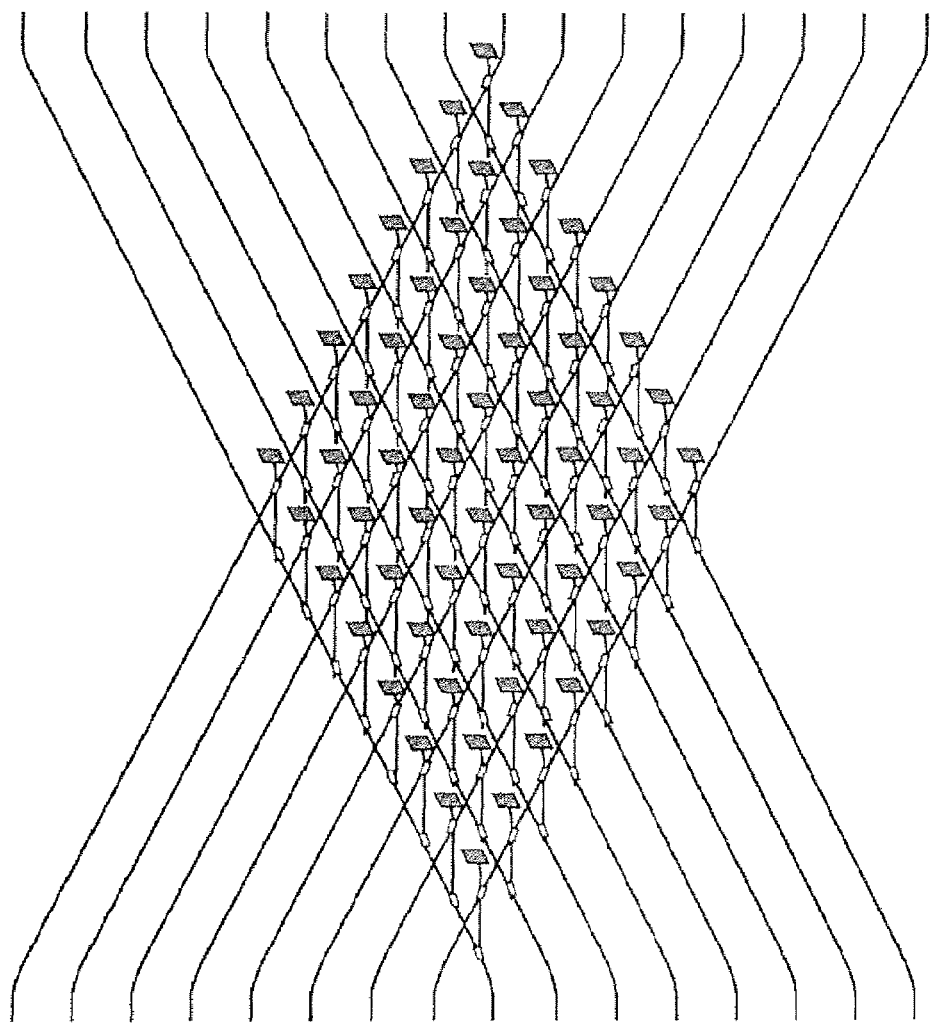

An optical signal from any one of the input waveguides 1301 may be routed to any one of the output waveguides 1302 via one or more optical switching nodes such as switching node 1305 and one or more intermediate waveguides between the input waveguides 1301 and output waveguides 1302. Some of the switching nodes of FIG. 13A may include one or more characteristics of switching elements described above. In one embodiment, some of the switching nodes may include multiple input and/or output ports, similar to those shown in FIGS. 4A and 4B. In addition, instead of using photonic detectors similar to photonic detectors 1203 of FIG. 12, auxiliary output waveguides 1303 may be implemented. Other configurations, such as, for example, one or more photonic detectors may be coupled to an output port of a switch of some switching nodes, as shown in FIG. 13B.

Figure 14A:
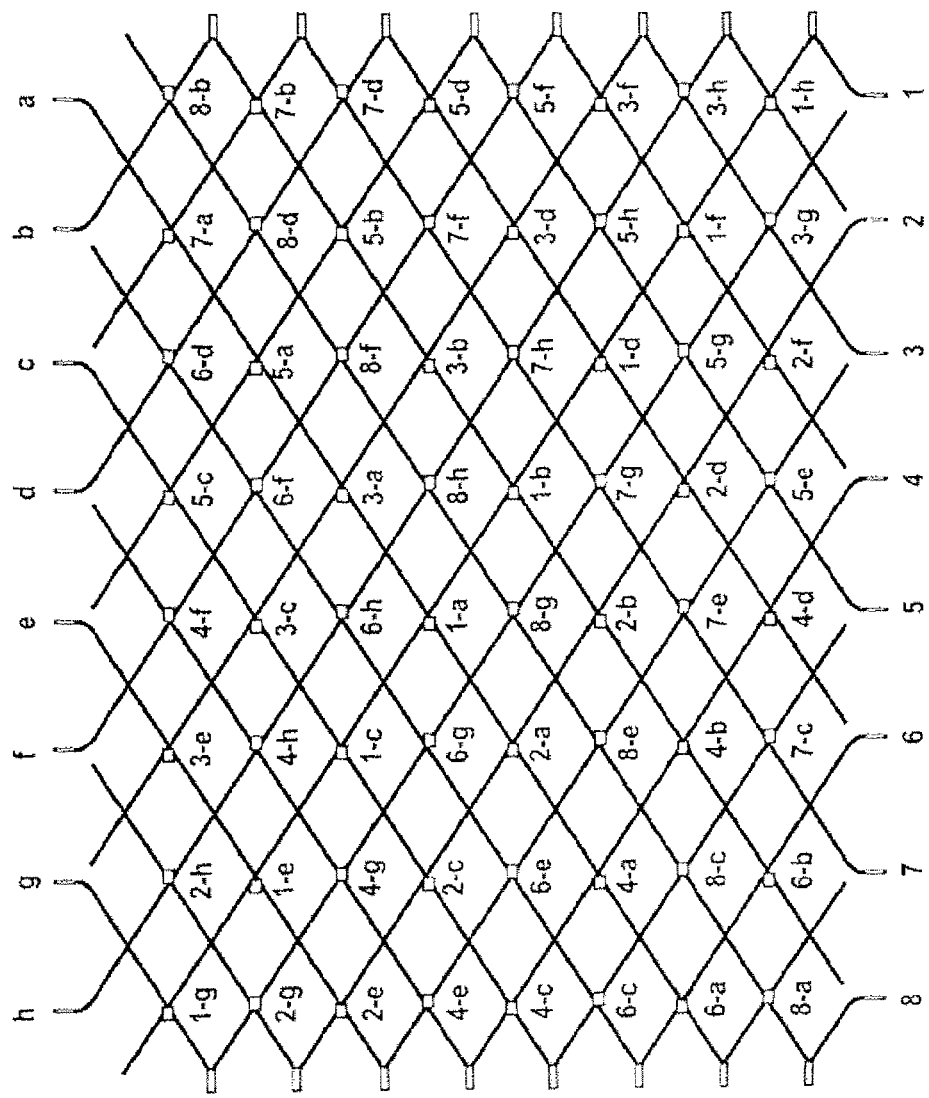
FIGS. 14A-14B are layouts illustrating routing algorithm within a switch matrix according to certain embodiments of the invention.
Figure 14B:
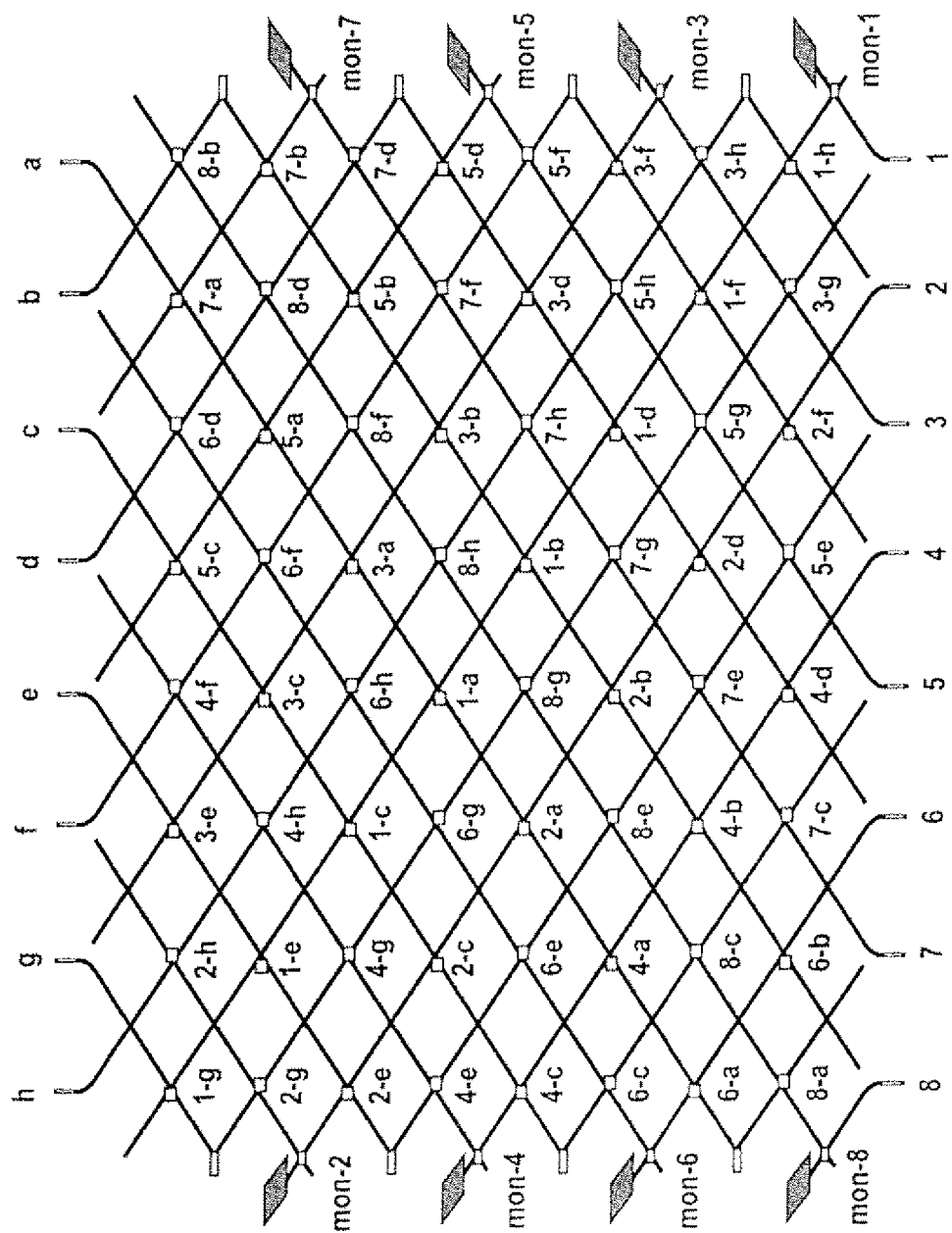

FIGS. 14A and 14B are layouts illustrating an exemplary routing algorithm within an optical switch matrix, according to one embodiment of the invention. In one embodiment, only 8 of the 64 nodes are powered at any given time. Furthermore, only one numerical value and only one particular letter is associated with a powered TIR X-switch. The switching nodes shown in FIGS. 14A and 14B may be a single or double crossbar switching nodes. In the case of single crossbar architecture, according to one embodiment, the routing algorithm may be summarized by the following table.

| | | | | | | output | | | | |
|---|---|---|---|---|---|---|---|---|---|---|
| | | element | a | b | c | d | e | f | g | h |
| input | 1 | node (TIR X-Sw) | switch | switch | switch | switch | switch | switch | switch | switch |
| | | mon-1 (TIR X-Sw w/PD) | VOA | VOA | VOA | VOA | VOA | VOA | VOA | VOA |
| | 2 | node (TIR X-Sw) | VOA | VOA | VOA | VOA | VOA | VOA | switch | switch |
| | | mon-2 (TIR X-Sw w/PD) | pass | pass | pass | pass | pass | pass | VOA | VOA |
| | 3 | node (TIR X-Sw) | switch | switch | switch | switch | switch | switch | VOA | VOA |
| | | mon-3 (TIR X-Sw w/PD) | VOA | VOA | VOA | VOA | VOA | VOA | pass | pass |
| | 4 | node (TIR X-Sw) | VOA | VOA | VOA | VOA | switch | switch | switch | switch |
| | | mon-4 (TIR X-Sw w/PD) | pass | pass | pass | pass | VOA | VOA | VOA | VOA |
| | 5 | node (TIR X-Sw) | switch | switch | switch | switch | VOA | VOA | VOA | VOA |
| | | mon-5 (TIR X-Sw w/PD) | VOA | VOA | VOA | VOA | pass | pass | pass | pass |
| | 6 | node (TIR X-Sw) | VOA | VOA | switch | switch | switch | switch | switch | switch |
| | | mon-6 (TIR X-Sw w/PD) | pass | pass | VOA | VOA | VOA | VOA | VOA | VOA |
| | 7 | node (TIR X-Sw) | switch | switch | VOA | VOA | VOA | VOA | VOA | VOA |

-continued

| | element | output | | | | | | | |
|---|---|---|---|---|---|---|---|---|---|
| | | a | b | c | d | e | f | g | h |
| | mon-7 (TIR X-Sw w/PD) | VOA | VOA | pass | pass | pass | pass | pass | pass |
| 8 | node (TIR X-Sw) | switch | switch | switch | switch | switch | switch | switch | switch |
| | mon-8 (TIR X-Sw w/PD) | VOA | VOA | VOA | VOA | VOA | VOA | VOA | VOA |

In the case of double crossbar architecture, the routing algorithm gives whether the two switches of a particular switching node (e.g., subnode-A and subnode-B) should operate as a 2×2 switch or as a 2×2 switch with variable optical attenuation, and whether the monitor 1×2 switch should simply pass the signal to the photodetector or perform as a 1×2 switch with variable optical attenuation. In one embodiment, the routing algorithm may be summarized by the following table.

Also, note that an exemplary switch matrix is not limited to a specific structure shown in an individual figure described above. It will be appreciated that an exemplary switch matrix may be implemented individually or in a combination of one or more characteristics and/or configurations described above. Further, the layout of the individual components, such as, for example, the switching elements, input and output waveguides, optical mirrors, waveguide bends, and/or photonic detectors, within each of the structures shown and

| | | | output | | | | | | | |
|---|---|---|---|---|---|---|---|---|---|---|
| | | element | a | b | c | d | e | f | g | h |
| input | 1 | first switch (TIR X-Sw) | switch | switch | switch | switch | switch | switch | switch | switch |
| | | second switch (TIR X-Sw) | switch | switch | switch | switch | switch | switch | switch | switch |
| | | mon-1 (TIR X-Sw w/PD) | VOA | VOA | VOA | VOA | VOA | VOA | VOA | VOA |
| | 2 | first switch (TIR X-Sw) | VOA | VOA | VOA | VOA | VOA | VOA | switch | switch |
| | | second switch (TIR X-Sw) | switch | switch | switch | switch | switch | switch | switch | switch |
| | | mon-2 (TIR X-Sw w/PD) | pass | pass | pass | pass | pass | pass | VOA | VOA |
| | 3 | first switch (TIR X-Sw) | switch | switch | switch | switch | switch | switch | VOA | VOA |
| | | second switch (TIR X-Sw) | switch | switch | switch | switch | switch | switch | switch | switch |
| | | mon-3 (TIR X-Sw w/PD) | VOA | VOA | VOA | VOA | VOA | VOA | pass | pass |
| | 4 | first switch (TIR X-Sw) | VOA | VOA | VOA | VOA | switch | switch | switch | switch |
| | | second switch (TIR X-Sw) | switch | switch | switch | switch | switch | switch | switch | switch |
| | | mon-4 (TIR X-Sw w/PD) | pass | pass | pass | pass | VOA | VOA | VOA | VOA |
| | 5 | first switch (TIR X-Sw) | switch | switch | switch | switch | VOA | VOA | VOA | VOA |
| | | second switch (TIR X-Sw) | switch | switch | switch | switch | switch | switch | switch | switch |
| | | mon-5 (TIR X-Sw w/PD) | VOA | VOA | VOA | VOA | pass | pass | pass | pass |
| | 6 | first switch (TIR X-Sw) | VOA | VOA | switch | switch | switch | switch | switch | switch |
| | | second switch (TIR X-Sw) | switch | switch | switch | switch | switch | switch | switch | switch |
| | | mon-6 (TIR X-Sw w/PD) | pass | pass | VOA | VOA | VOA | VOA | VOA | VOA |
| | 7 | first switch (TIR X-Sw) | switch | switch | VOA | VOA | VOA | VOA | VOA | VOA |
| | | second switch (TIR X-Sw) | switch | switch | switch | switch | switch | switch | switch | switch |
| | | mon-7 (TIR X-Sw w/PD) | VOA | VOA | pass | pass | pass | pass | pass | pass |
| | 8 | first switch (TIR X-Sw) | switch | switch | switch | switch | switch | switch | switch | switch |
| | | second switch (TIR X-Sw) | switch | switch | switch | switch | switch | switch | switch | switch |
| | | mon-8 (TIR X-Sw w/PD) | VOA | VOA | VOA | VOA | VOA | VOA | VOA | VOA |

Note that the algorithms shown in the above tables are also valid for the various cases where TIR X-switches are selectively replaced or completely replaced with TIR Y-switches. Even the TIR X-switches used to make the power monitor (e.g., mon-1) may be replaced with TIR Y-switches. The detailed optical properties such as optical loss, crosstalk, switching characteristics and the performance of the power monitors may be different between the cases of using TIR X-switches and TIR Y-switches. Other configurations may be implemented.

described above are for illustration purposes only. Other layouts and/or more or less components may be combined to implement an optical switch matrix using the aforementioned techniques.

Thus, an optical switch matrix has been described. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An optical switch matrix, comprising:
   a plurality of input waveguides;
   a plurality of output waveguides; and
   one or more switching nodes and one or more intermediate waveguides to interconnect any one of the input waveguides to any one of the output waveguides,
   wherein at least one switching node includes a first switch coupling an incoming waveguide to an intermediate waveguide and a second switch coupling the intermediate waveguide to an outgoing waveguide, and wherein the second switch includes a first and second input ports and a first and second output ports, the first input port receiving the intermediate waveguide and the first output port coupling to the outgoing waveguide, wherein at least one of the second switches is capable of partially switching to divert at least a portion of an optical signal traversing through the second output port of the respective second switch, while allowing a remainder of the optical signal traveling through the first output port; and
   at least one photonic detector coupled to a second output port of at least one of the second switches, wherein the respective photonic detector receives the portion of the optical signal diverted via the second output port.

2. The optical switch matrix of claim 1, wherein the photonic detector includes a photo diode.

3. The optical switch matrix of claim 1, wherein the photonic detector detects and converts the optical signal into one or more electrical signals.

4. The optical switch matrix of claim 3, wherein the one or more electrical signals are used to measure one or more properties of the optical signal.

5. The optical switch matrix of claim 1, further comprising a plurality of auxiliary input waveguides, each of the auxiliary input waveguides corresponding to each of the plurality of input waveguides, wherein at least one auxiliary input waveguide is coupled to the second input port of a second switch of at least one switching node.

6. The optical switch matrix of claim 1, wherein the second switch of the at least one switching node routes an optical signal received by the at least one auxiliary input waveguide to one of the output waveguides, while blocking at least a portion of the corresponding optical signal received by the corresponding input waveguide.

7. An optical switch matrix, comprising:
   a plurality of input waveguides;
   a plurality of output waveguides; and
   one or more switching nodes and one or more intermediate waveguides to interconnect any one of the input waveguides to any one of the output waveguides,
   wherein at least one switching node includes a first switch coupling an incoming waveguide to an intermediate waveguide and a second switch coupling the intermediate waveguide to an outgoing waveguide, and wherein the second switch includes a first and second input ports and a first and second output ports, the first input port receiving the intermediate waveguide and the first output port coupling to the outgoing waveguide,
   wherein the first switch is one of an X and Y switches having a first and second output ports, wherein the first output port is coupled to the respective intermediate waveguide, and
   wherein the second output port of the first switch is coupled to an auxiliary output waveguide corresponding to the respective output waveguide, and wherein the first switch is capable of partially switching to divert at least a portion of an optical signal received by the corresponding input waveguide to a corresponding auxiliary output waveguide, while a remainder of the optical signal is routed to the corresponding output waveguide.

8. An optical switch matrix, comprising:
   a plurality of input waveguides;
   a plurality of output waveguides; and
   one or more switching nodes and one or more intermediate waveguides to interconnect any one of the input waveguides to any one of the output waveguides,
   wherein at least one switching node includes a first switch coupling an incoming waveguide to an intermediate waveguide and a second switch coupling the intermediate waveguide to an outgoing waveguide, and wherein the second switch includes a first and second input ports and a first and second output ports, the first input port receiving the intermediate waveguide and the first output port coupling to the outgoing waveguide, and
   wherein the first and second switches are total internal reflection (TIR) switches implemented based on a carrier injection in a semiconductor material.

9. An optical switch matrix, comprising:
   a plurality of input waveguides;
   a plurality of output waveguides; and
   one or more switching elements and one or more intermediate waveguides to interconnect any one of the input waveguides to any one of the output waveguides,
   wherein at least one of the switching elements includes a first input port, a first output port, and second output port, the first input port receiving an incoming waveguide and the first output port coupling to an outgoing waveguide; and
   at least one photonic detector coupled to the second output port of the at least one switching element, wherein the switching element is capable of partially switching to divert at least a portion of an optical signal received from the first input port to the second output port, while allowing a remainder of the optical signal to be routed to the first output port, and wherein the respective photonic detector detects the portion of the optical signal from the second output port.

10. The optical switch matrix of claim 9, wherein at least one photonic detector converts the portion of an optical signal into one or more electrical signals, and wherein the electrical signals are used to measure one or more attributes of the optical signal.

11. The optical switch matrix of claim 9, wherein the photonic detector includes a photo diode.

12. The optical switch matrix of claim 9, further comprising a plurality of auxiliary input waveguides, each of the auxiliary input waveguides corresponding to each of the plurality of input waveguides, wherein at least one auxiliary input waveguide is coupled to a second input port of at least one switching element.

13. The optical switch matrix of claim 12, wherein the switching element routes an optical signal received by the at least one auxiliary input waveguide to at least one of the first and second output ports, while effectively blocking the corresponding optical signal received at the first input port by routing it to the corresponding auxiliary output waveguide.

14. The optical switch matrix of claim 12, further comprising one or more auxiliary output waveguides coupled to a second output port of one or more switching element, the one or more auxiliary output waveguides receiving optical signals from one of the input waveguides.

15. The optical switch matrix of claim 9, wherein the switching element is a total internal reflection (TIR) switch implemented based on a carrier injection in a semiconductor material.

16. An optical switch matrix, comprising:
N input waveguides disposed on an input side of the matrix, N being an integer greater than 2;
N output waveguides disposed on an output side of the matrix;
a plurality of switching elements and intermediate waveguides to interconnect any one of the N input waveguides and any one of the N output waveguides, wherein an optical signal received at one of the N input waveguides reaches one of the N output waveguides via N switching elements of the plurality of switching elements; and
a plurality of optical mirrors disposed along one or more sides other than the input and output sides of the matrix to direct optical signals from a direction of the input side towards a direction of the output side.

17. The optical switch matrix of claim 16, further comprising a plurality of waveguide bends disposed along one or more sides other than the input and output sides of the matrix to direct optical signals from a direction of the input side towards another direction of the output side.

18. The optical switch matrix of claim 16, wherein the optical mirrors are waveguide total internal reflection (TIR) mirrors, wherein the waveguide TIR mirrors use an interface with air to generate a TIR effect.

19. An optical switch matrix, comprising:
N input waveguides disposed on an input side of the matrix, N being an integer greater than 2;
N output waveguides disposed on an output side of the matrix; and
a plurality of switching elements and intermediate waveguides to interconnect any one of the N input waveguides and any one of the N output waveguides, wherein an optical signal received at one of the N input waveguides reaches one of the N output waveguides via N switching elements of the plurality of switching elements,
wherein at least one of the switching elements comprises a first switch a second switch, and a further intermediate waveguide to couple a first waveguide to a second waveguide, and wherein the first and second waveguides are one of the input, output, and intermediate waveguides, and
wherein the first switch couples the first waveguide to the further intermediate waveguide and the second switch couples the further intermediate waveguide to the second waveguide, wherein an optical signal travels from the first waveguide to the second waveguide, wherein the second switch includes an input port, a first output port, and a second output port, and wherein the first output ports is coupled to the second waveguide, and wherein the at least one of the switching elements further comprises a photonic detector coupled to the second output port of the second switch, wherein the second switch is capable of partially switching to divert at least a portion of the optical signal to the photonic detector via the second output port.

20. The optical switch matrix of claim 19, wherein the photonic detector includes a photo diode.

21. The optical switch matrix of claim 19, wherein the photonic detector detects and converts the optical signal into one or more electrical signals for measuring one or more attributes of the optical signal.

22. An optical switch matrix, comprising:
N input waveguides disposed on an input side of the matrix, N being an integer greater than 2;
N output waveguides disposed on an output side of the matrix; and
a plurality of switching elements and intermediate waveguides to interconnect any one of the N input waveguides and any one of the N output waveguides, wherein an optical signal received at one of the N input waveguides reaches one of the N output waveguides via N switching elements of the plurality of switching elements,
wherein at least one switching element immediately adjacent to at least one of the output waveguides comprises a first output port and a second output port, wherein the first output port is coupled to the respective output waveguide, and wherein the switching element is capable of partially switching to divert at least a portion of an optical signal to the second output port while allowing a remainder of the optical signal to be routed to the first output port.

23. An optical switch matrix, comprising:
N input waveguides disposed on an input side of the matrix, N being an integer greater than 2;
N output waveguides disposed on an output side of the matrix; and
a plurality of switching elements and intermediate waveguides to interconnect any one of the N input waveguides and any one of the N output waveguides, wherein an optical signal received at one of the N input waveguides reaches one of the N output waveguides via N switching elements of the plurality of switching elements,
wherein at least one switching element immediately adjacent to at least one of the output waveguides comprises a first output port and a second output port, wherein the first output port is coupled to the respective output waveguide and at least one photonic detector coupled to the second output port of the respective switching element, the photonic detector detecting and converting the optical signal into one or more electrical signals, wherein the one or more electrical signals are used to measure one or more attribute of the optical signal.

24. The optical switch matrix of claim 23, wherein the at least one photonic detector includes a photo diode.

25. An optical switch matrix, comprising:
N input waveguides disposed on an input side of the matrix, N being an integer greater than 2;
N output waveguides disposed on an output side of the matrix;
a plurality of switching elements and intermediate waveguides to interconnect any one of the N input waveguides and any one of the N output waveguides, wherein an optical signal received at one of the N input waveguides reaches one of the N output waveguides via N switching elements of the plurality of switching elements; and
a plurality of additional switching elements disposed along one or more sides other than the input and output sides of the matrix, the additional switching elements directing optical signals from a direction of the input side towards another direction of the output side.

26. The optical switch matrix of claim 25, wherein at least one of the additional switching elements comprises a plurality of output ports, and wherein at least one additional switching element is capable of partially switching to divert at least a portion of an optical signal to one of the output ports while allowing a remainder of the optical signal to be routed to one or more other output ports.

27. The optical switch matrix of claim 26, further comprises at least one photonic detector coupled to an output port of at least one of the additional switching elements, wherein the photonic detector detects and converts the optical signal to one or more electrical signals for analyzing one or more attributes of the optical signal.

28. The optical switch matrix of claim 27, wherein the at least one photonic detector includes a photo diode.

29. An optical switch matrix, comprising:
N input waveguides disposed on an input side of the matrix, N being an integer greater than 2;
N output waveguides disposed on an output side of the matrix; and
a plurality of switching elements and intermediate waveguides to interconnect any one of the N input waveguides and any one of the N output waveguides, wherein an optical signal received at one of the N input waveguides reaches one of the N output waveguides via N switching elements of the plurality of switching elements,
wherein each of the switching elements is a total internal reflection (TIR) switch implemented based on a carrier injection in a semiconductor material.

30. An optical switch matrix, comprising:
a plurality of input waveguides disposed on an input side of the matrix;
a plurality of output waveguides disposed on an output side of the matrix;
a plurality of switching elements and intermediate waveguides to interconnect any one of the input waveguides and any one of the output waveguides;
a plurality of lateral side elements disposed on one or more lateral sides other than the input and output side of the matrix, each of the lateral side elements inwardly directing an optical signal received from one of the input waveguides towards one of the output waveguides via at least a portion of the plurality of switching elements and intermediate waveguides, wherein at least one of the switching elements comprises a first output port and a second output port, wherein the switching element is capable of partially switching to divert at least a portion of an optical signal to the first output port while routing a remainder of the optical signal to the second output port; and
a photonic detector coupled to the first output port of at least one switching element to detect the portion of the optical signal diverted to the first output port while the remaining portion of the optical signal is routed to the second output port.

31. The optical switch matrix of claim 30, wherein the photonic detector comprises a photo diode.

32. The optical switch matrix of claim 30, wherein the at least one of the switching elements having a photonic detector is located immediately adjacent to an output waveguide.

33. The optical switch matrix of claim 30, wherein the at least one of the switching elements having a photonic detector is an interior switching element within the input and output waveguides and the lateral side elements.

34. The optical switch matrix of claim 30, wherein the photonic detector detects and converts the received optical signal to one or more electrical signals for measuring one or more attributes of the optical signal.

35. An optical switch matrix, comprising:
a plurality of input waveguides disposed on an input side of the matrix;
a plurality of output waveguides disposed on an output side of the matrix;
a plurality of switching elements and intermediate waveguides to interconnect any one of the input waveguides and any one of the output waveguides; and
a plurality of lateral side elements disposed on one or more lateral sides other than the input and output side of the matrix, each of the lateral side elements inwardly directing an optical signal received from one of the input waveguides towards one of the output waveguides via at least a portion of the plurality of switching elements and intermediate waveguides,
wherein at least one of the switching elements is a total internal reflection (TIR) switch implemented based on a carrier injection in a semiconductor material.

36. An optical switch matrix, comprising:
a plurality of input waveguides disposed on an input side of the matrix;
a plurality of output waveguides disposed on an output side of the matrix;
a plurality of switching elements and intermediate waveguides to interconnect any one of the input waveguides and any one of the output waveguides; and
a plurality of lateral side elements disposed on one or more lateral sides other than the input and output side of the matrix, each of the lateral side elements inwardly directing an optical signal received from one of the input waveguides towards one of the output waveguides via at least a portion of the plurality of switching elements and intermediate waveguides,
wherein at least one of the lateral side element comprises a waveguide bend to direct optical signals from a direction of the input side towards another direction of the output side.

37. An optical switch matrix, comprising:
a plurality of input waveguides disposed on an input side of the matrix;
a plurality of output waveguides disposed on an output side of the matrix;
a plurality of switching elements and intermediate waveguides to interconnect any one of the input waveguides and any one of the output waveguides; and
a plurality of lateral side elements disposed on one or more lateral sides other than the input and output side of the matrix, each of the lateral side elements inwardly directing an optical signal received from one of the input waveguides towards one of the output waveguides via at least a portion of the plurality of switching elements and intermediate waveguides,
wherein at least one of the lateral side element comprises an optical mirror to direct optical signals from a direction of the input side towards a direction of the output side.

38. The optical switch matrix of claim 30, wherein at least one of the lateral side element comprises a side-switching element to direct optical signals from a direction of the input side towards another direction of the output side.

39. The optical switch matrix of claim 38, wherein at least one of the side-switching element comprises a plurality of output ports and wherein the at least one switching element is capable of partially switching to divert at least a portion of an optical signal to one of the output ports while routing a remainder of the optical signal to one or more other output ports.

40. An optical switch matrix, comprising:

a plurality of input waveguides disposed on an input side of the matrix;

a plurality of output waveguides disposed on an output side of the matrix;

a plurality of switching elements and intermediate waveguides to interconnect any one of the input waveguides and any one of the output waveguides;

a plurality of lateral side elements disposed on one or more lateral sides other than the input and output side of the matrix, each of the lateral side elements inwardly directing an optical signal received from one of the input waveguides towards one of the output waveguides via at least a portion of the plurality of switching elements and intermediate waveguides, wherein at least one of the lateral side element comprises a side-switching element to direct optical signals from a direction of the input side towards another direction of the output side, and wherein at least one of the side-switching element comprises a plurality of output ports, and wherein the at least one switching element is capable of partially switching to divert at least a portion of an optical signal to one of the output ports while routing a remainder of the optical signal to one or more other output ports; and at least one photonic detector coupled to an output port of the at least one of the side-switching element, wherein the photonic detector detects and converts the optical signal to one or more electrical signals for analyzing one or more attributes of the optical signal.

41. The optical switch matrix of claim 40 wherein at least one of the side-switching element is a total internal reflection (TIR) switch implemented based on a carrier injection in a semiconductor material.

42. An optical switch matrix, comprising:

a plurality of input waveguides disposed on an input side of the matrix;

a plurality of output waveguides disposed on an output side of the matrix;

a plurality of switching elements and intermediate waveguides to interconnect any one of the input waveguides and any one of the output waveguides; and a plurality of lateral side elements disposed on one or more lateral sides other than the input and output side of the matrix, each of the lateral side elements inwardly directing an optical signal received from one of the input waveguides towards one of the output waveguides via at least a portion of the plurality of switching elements and intermediate waveguides, wherein the plurality of lateral side elements comprises a combination of at least two of a waveguide bend, an optical mirror, and a side-switching element, to direct optical signals from a direction of the input side towards another direction of the output side.

43. The optical switch matrix of claim 42, wherein at least one of the side-switching element comprises a plurality of output ports, and wherein the at least one switching element is capable of partially switching to divert at least a portion of an optical signal to one of the output ports while routing a remainder of the optical signal to one or more other output ports.

44. The optical switch matrix of claim 43, wherein a photonic detector is coupled to an output port of at least one of the side-switching element to detect and convert an optical signal to one or more electrical signals.

45. The optical switch matrix of claim 30, wherein each of the switching elements is one of an X switch and a Y switch.

\* \* \* \* \*